US011001767B2

(12) United States Patent
Gunther et al.

(10) Patent No.: US 11,001,767 B2
(45) Date of Patent: May 11, 2021

(54) NAPHTHA REFORMER YIELD USING MODIFIED ZEOLITIC CATALYSTS

(71) Applicant: ExxonMobil Research and Engineering Company, Annandale, NJ (US)

(72) Inventors: William R. Gunther, Clinton, NJ (US); Brandon J. O'Neill, Lebanon, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 16/849,409

(22) Filed: Apr. 15, 2020

(65) Prior Publication Data

US 2020/0339891 A1 Oct. 29, 2020

Related U.S. Application Data

(60) Provisional application No. 62/839,185, filed on Apr. 26, 2019.

(51) Int. Cl.
*C10G 59/02* (2006.01)
*B01J 37/00* (2006.01)
(Continued)

(52) U.S. Cl.
CPC ............ *C10G 59/02* (2013.01); *B01J 29/126* (2013.01); *B01J 37/0009* (2013.01);
(Continued)

(58) Field of Classification Search
CPC .................................. C10G 59/02; C10G 3/49
(Continued)

(56) References Cited

U.S. PATENT DOCUMENTS 4,292,167 A * 9/1981 Bonacci ................... B01J 29/40
208/62
4,341,622 A * 7/1982 Tabak ..................... C10G 45/64
208/66
(Continued)

FOREIGN PATENT DOCUMENTS

WO 9836037 A1 8/1998

*Primary Examiner* — Nina Bhat
(74) *Attorney, Agent, or Firm* — Robert A. Migliorini

(57) ABSTRACT

Methods and systems for the conversion of hydrocarbon feedstocks, in particular, naphtha feedstocks, into a hydrocarbon product stream containing a high yield of high-octane gasoline and chemicals products. In particular, the conversion takes place over a series of functionally distinctive catalyst beds, at least one of which includes a modified zeolitic catalyst comprising a zeolite, a transition metal, and optionally a binder. Systems provided include a hydrocarbon feed stream, which may be full-range naphtha, a hydrocarbon product stream, and a plurality of functionally distinctive catalyst beds arranged in series, wherein at least one of the catalyst beds comprises a modified zeolitic catalyst. A hydrocarbon feed stream may be conveyed through the plurality of functionally distinctive catalyst beds, producing an intermediate hydrocarbon stream between each, under conditions effective to convert the hydrocarbon feed stream to a hydrocarbon product stream comprising high-octane gasoline, xylenes, benzene, and/or toluene.

16 Claims, 4 Drawing Sheets

(51) Int. Cl.
  *B01J 29/08* (2006.01)
  *C10G 35/095* (2006.01)
  *B01J 29/12* (2006.01)
  *C10G 35/09* (2006.01)

(52) U.S. Cl.
  CPC ......... *C10G 35/09* (2013.01); *C10G 35/095* (2013.01); *B01J 2029/081* (2013.01); *B01J 2229/16* (2013.01); *B01J 2229/20* (2013.01); *B01J 2229/42* (2013.01); *B01J 2229/60* (2013.01); *C10G 2300/1044* (2013.01); *C10G 2300/301* (2013.01); *C10G 2300/305* (2013.01); *C10G 2300/308* (2013.01); *C10G 2300/70* (2013.01); *C10G 2400/02* (2013.01); *C10G 2400/30* (2013.01)

(58) Field of Classification Search
  USPC ........ 422/625, 636, 644; 208/65, 69, 73, 74; 585/319, 320, 412, 419
  See application file for complete search history.

(56) References Cited

U.S. PATENT DOCUMENTS

| | | | |
|---|---|---|---|
| 5,108,969 A | 4/1992 | Del Rossi et al. | |
| 5,211,838 A * | 5/1993 | Staubs | C10G 59/02 208/63 |
| 5,997,730 A | 12/1999 | Drake et al. | |
| 6,074,975 A | 6/2000 | Yao et al. | |
| 6,096,936 A | 8/2000 | Fukunaga et al. | |
| 6,593,503 B1 | 7/2003 | Wu et al. | |
| 6,689,708 B2 * | 2/2004 | Barrera | B01J 29/126 502/64 |
| 7,459,072 B2 * | 12/2008 | Bitterlich | B01D 61/362 208/106 |
| 7,981,272 B2 * | 7/2011 | Dziabis | C10G 59/02 208/64 |
| 8,163,249 B2 * | 4/2012 | Chyou | B01D 46/002 422/171 |
| 8,518,240 B2 * | 8/2013 | Serban | C10G 35/04 208/64 |
| 8,758,599 B2 * | 6/2014 | Lapinski | C10G 35/09 208/138 |
| 9,199,893 B2 * | 12/2015 | Lapinski | C10G 50/00 |
| 9,266,091 B2 * | 2/2016 | Serban | B01J 27/10 |
| 9,446,389 B2 | 9/2016 | Ghosh et al. | |
| 10,173,950 B2 * | 1/2019 | Abudawoud | C07C 15/06 |
| 10,501,389 B1 * | 12/2019 | Xu | C07C 5/2729 |
| 10,537,867 B2 * | 1/2020 | McGahee | B01J 8/062 |
| 10,596,558 B2 * | 3/2020 | Arvind | B01J 29/088 |
| 10,696,609 B2 * | 6/2020 | Xu | C07C 7/10 |
| 2009/0200202 A1 | 8/2009 | Grande et al. | |
| 2011/0147265 A1 * | 6/2011 | Serban | C10G 25/00 208/64 |
| 2013/0068663 A1 * | 3/2013 | Beeckman | B01J 29/126 208/134 |
| 2016/0145507 A1 * | 5/2016 | Miller | C10G 35/065 208/65 |
| 2017/0072387 A1 | 3/2017 | Sharma et al. | |
| 2017/0106352 A1 | 4/2017 | Sharma et al. | |
| 2017/0283717 A1 * | 10/2017 | Dandekar | C10G 69/02 |

\* cited by examiner

NAPHTHA REFORMER YIELD USING MODIFIED ZEOLITIC CATALYSTS

CROSS-REFERENCE TO RELATED APPLICATIONS

This application claims priority to U.S. Provisional Application No. 62/839,185 filed Apr. 26, 2019, which is herein incorporated by reference in its entirety.

BACKGROUND OF THE INVENTION

This application relates to methods and systems for the conversion of hydrocarbon feedstocks, in particular, naphtha feedstocks, into a hydrocarbon product stream containing a high yield of high-octane gasoline and/or chemicals products (e.g., benzene, toluene, and xylenes). In particular, the conversion takes place over a series of functionally distinctive catalyst beds, at least one of which includes a modified zeolitic catalyst as described herein, configured to subject a hydrocarbon feed stream to a preferred order of reforming reactions.

Naphtha reforming has been an important refining process for decades, generating hydrogen, chemicals feedstock (benzene, toluene, xylenes, which are also known as BTX), and high-octane gasoline. A typical naphtha feedstock will contain paraffins, olefins, naphthenes, aromatics, and isomers thereof. To reform a typical naphtha feedstock into gasoline and/or BTX, a reforming catalyst converts these molecules into aromatics. Isoparaffins may be present in gasoline as well, though isoparaffins contribute much less than aromatics to the octane rating and do not contribute to BTX yield at all. Paraffins and naphthenes contribute even less to octane rating. To carry out the necessary reforming reactions, reforming catalysts typically include a metal (e.g., platinum) to dehydrogenate paraffins and naphthenes (to form olefins and aromatics, respectively) and an acid function to catalyze the ring closure of the olefins and isomerization of remaining paraffins. However, paraffin-to-aromatic conversion is not particularly favored by conventional reforming catalysts and conversion is often slow and/or incomplete.

Metal-doped chlorided alumina is the most common reforming catalyst; however, chlorided alumina has its limitations. For example, chlorided alumina catalysts tend to favor paraffin isomerization at the expense of paraffin dehydrocyclization, which is undesirable for the reasons noted above. Metal-doped chlorided alumina, however, is good at dehydrogenation. Therefore, feedstocks best suited for chlorided alumina catalysts are typically limited to those having a low paraffin content and a higher naphthene content.

Chlorided alumina is also intolerant to chemical impurities in a feedstock. In particular, basic nitrogen in a feedstock will react with chloride loaded onto a chlorided alumina catalyst, effectively stripping the catalyst of its acidity (and activity), but also forming a compound (chloramine) that is corrosive to the reforming system. Finally, but not least importantly, chlorided alumina catalysts are susceptible to deactivation by coking, particularly under operating conditions most suited to forming a high-octane product stream. As coke accumulates, it blocks active sites for performing the reforming reactions, leading to reduced product yields.

Zeolitic catalysts may be modified to favor paraffin-to-aromatic conversion; however, such zeolites are also particularly good at converting naphthenes into paraffins. Thus, feedstocks best suited for zeolitic catalysts include as little naphthenes as possible. Additionally, much of the reforming catalytic activity in a zeolitic catalyst takes place in its pores. Mass diffusion of hydrocarbons from a hydrocarbon feed stream into and out of the pores dictate the catalytic activity and selectivity. As such, larger molecules are difficult to convert as their size excludes them from entering a pore. Thus, in addition to limiting the naphthene content, suitable feedstocks for zeolitic catalysts preferably have smaller hydrocarbons that easily diffuse in and out of the pores of a zeolite. However, the smallest hydrocarbons (e.g., $C_1$-$C_5$ hydrocarbons) are not readily converted to aromatics and their presence in a feedstock does not lend itself to formation of a high-octane product stream. Thus, $C_6$-$C_7$ feedstock (as opposed to a full-range $C_4$-$C_{12}$ feed) is most preferred. A $C_6$-$C_7$ feedstock, in turn, produces a hydrocarbon product stream that is primarily benzene and toluene products.

What is needed is a reforming system that that can effectively convert hydrocarbon feedstocks having varying paraffin and naphthenic content as well as varying sizes of hydrocarbons, into a high-octane hydrocarbon product stream and/or a product stream having high BTX yield.

SUMMARY

This application relates to methods and systems for the conversion of a hydrocarbon feedstock, in particular, naphtha feedstock, into a hydrocarbon product stream containing a high yield of high-octane gasoline and chemicals products (e.g., benzene, toluene, and xylenes). In particular, the conversion takes place over a series of functionally distinctive catalyst beds, at least one of which includes a modified zeolitic catalyst as described herein, to generate a preferred order of reforming reactions, thus achieving a high-octane product stream with a high yield of $C_{5+}$ hydrocarbons.

Provided herein are systems that include a system for converting hydrocarbons, wherein the system comprises: a hydrocarbon feed stream; an intermediate hydrocarbon feed stream comprising not more than about 34 wt. % naphthenes; a hydrocarbon product stream comprising at least one product selected from the group consisting of high-octane gasoline, xylenes, benzene, and toluene, wherein when the hydrocarbon product stream has a RON of about 95, the $C_{5+}$ fraction yield is at least about 80 wt. %; a plurality of functionally distinctive catalyst beds arranged in sequence, wherein at least one of the functionally distinctive catalyst beds is constructed and arranged to accept the intermediate feed stream and comprises a first modified zeolitic catalyst comprising a zeolite, a transition metal, and optionally a binder, a hydrocarbon feed inlet constructed and arranged to convey the hydrocarbon feed stream to the plurality of sequential functionally distinctive catalyst beds, and a hydrocarbon product outlet constructed and arranged to accept the hydrocarbon product stream leaving the plurality of functionally distinctive catalyst beds.

Provided herein are methods that include a method for converting hydrocarbons comprising: providing a hydrocarbon feed stream; contacting the hydrocarbon feed stream with a first functionally distinctive catalyst bed under a first set of conditions, providing a first intermediate hydrocarbon stream having a naphthene content of not more than about 34 wt. %; contacting the first intermediate hydrocarbon stream with a second functionally distinctive catalyst bed under a second set of conditions; and producing a hydrocarbon product stream comprising at least one product selected from the group consisting of high-octane gasoline, xylenes, toluene, and benzene, wherein at l7east one of the first or second functionally distinctive catalyst beds comprises a first modified zeolitic catalyst comprising a zeolite, a transition metal, and optionally a binder, and wherein when the hydrocarbon product stream has a RON of about 95, the $C_{5+}$ fraction yield is at least about 80 wt. %.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
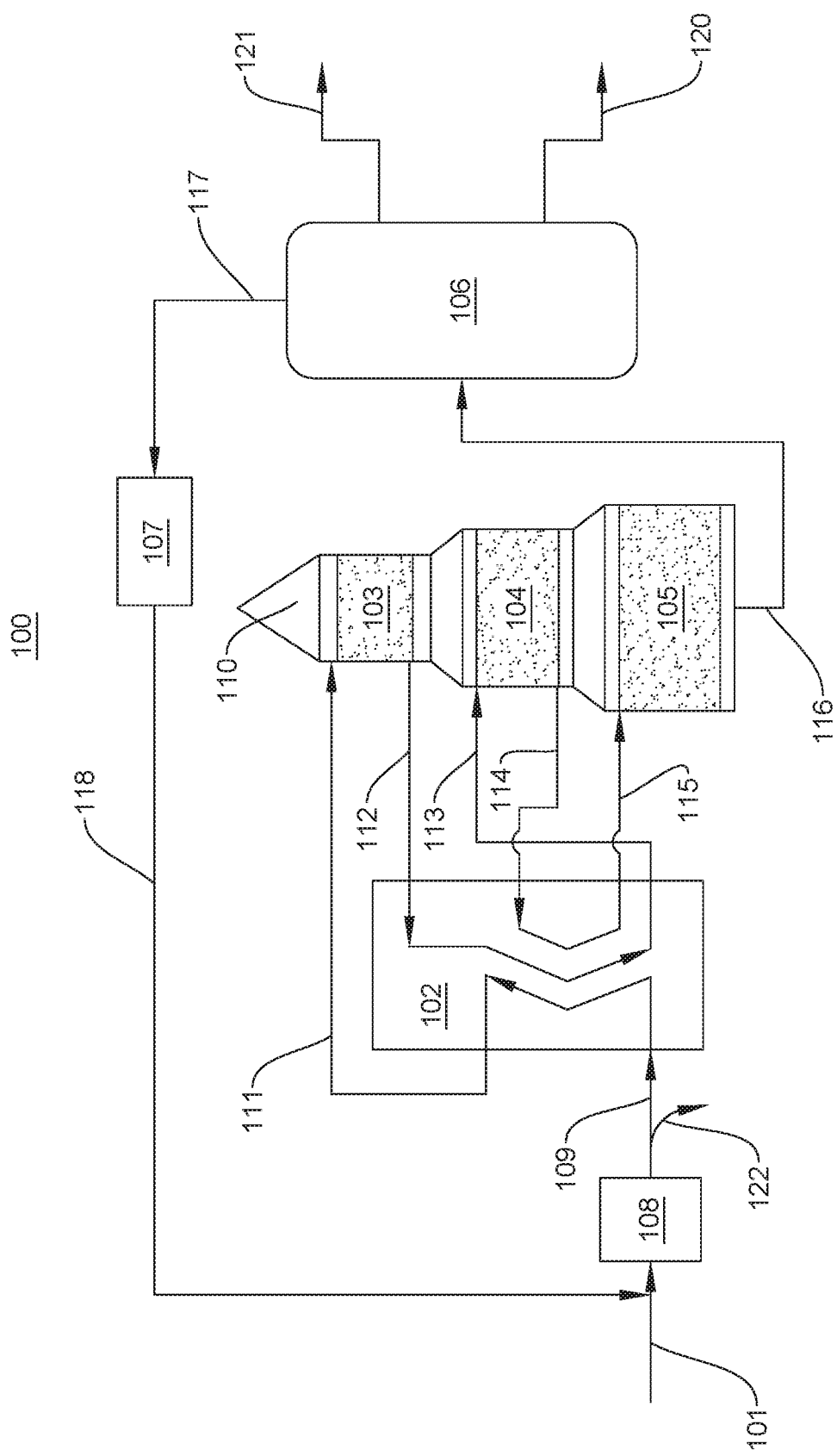
FIG. 1 illustrates an example reforming system comprising a stacked bed reactor, one of the catalyst beds comprising a modified zeolitic catalyst as described herein, to convert a hydrocarbon feed stream.

This application relates to the methods and systems for the conversion of a hydrocarbon feedstock, in particular, naphtha feedstock, into a hydrocarbon product stream containing a high yield of high-octane gasoline and chemicals products (e.g., benzene, toluene, and xylenes). In particular, the conversion takes place over a series of functionally distinctive catalyst beds, at least one of which includes a modified zeolitic catalyst as described herein, to induce a preferred order of reforming reactions, thus achieving a high-octane product stream with a high yield of $C_{5+}$ hydrocarbons.

To facilitate an understanding of the present invention, a number of terms and phrases are defined below and in the text following.

For purposes of this disclosure and the claims hereto, the numbering scheme for the Periodic Table Groups is according to the IUPAC Periodic Table of Elements (Dec. 1, 2018).

As used in the present disclosure and claims, the singular forms "a," "an," and "the" include plural forms unless the context clearly dictates otherwise.

The term "and/or" as used in a phrase such as "A and/or B" herein is intended to include "A and B", "A or B", "A", and "B".

Alpha value is an approximate indication of the catalytic cracking activity of a catalyst compared to a standard catalyst and gives the relative rate constant (rate of normal hexane conversion per volume of catalyst per unit time). It is based on the activity of silica-alumina cracking catalyst having an alpha value of 1 (Rate Constant=0.016 s$^{-1}$). The alpha test is described in U.S. Pat. No. 3,354,078; in the Journal of Catalysis, 4, 527 (1965); 6, 278 (1966); and 61, 395 (1980), each incorporated herein by reference with respect to its disclosure of how to carry out the alpha test. The experimental conditions of the test used herein include a constant temperature of 1000° F. (537.8° C.) and a variable flow rate as described in detail in the Journal of Catalysis, 61, 395. The effluent product stream may be analyzed by vapor chromatography.

Collidine uptake can be determined as the micromoles of collidine absorbed per gram of sample that is dried under nitrogen flow at 200° C. for 60 minutes on a Thermogravimetric Analyzer (Model Q5000), manufactured by TA Instruments, New Castle, Del.). After drying the sample, the collidine can be sparged over the sample. The collidine uptake can then be calculated from the following formula: (weight of sample after sparging with collidine—weight of dried sample×10$^6$÷(molecular weight of collidine×weight of dried sample). As used herein, "collidine uptake" refers to an uptake calculated after sparging the sample for 60 minutes at a collidine partial pressure of 3 torr.

As used herein, and unless otherwise specified, the term "hydrocarbon" means a class of compounds containing hydrogen bound to carbon, and encompasses saturated hydrocarbons, unsaturated hydrocarbons, and mixtures thereof, including mixtures of hydrocarbons having different values of n.

As used herein, and unless otherwise specified, the term "$C_n$" means hydrocarbon(s) having n carbon atom(s) per molecule, wherein n is a positive integer. As used herein, and unless to otherwise specified, the term "$C_{n+}$" refers to a hydrocarbon composition defined by hydrocarbons having "n" or more carbon atoms, where "n" is an integer greater than 0. This includes paraffins, olefins, cyclic hydrocarbons, and aromatics and isomers thereof. Similarly, the term "$C_{n-}$" refers to a hydrocarbon composition defined by hydrocarbons having "n" or fewer carbon atoms, wherein "n" is an integer greater than 0. This includes paraffins, olefins, cyclic hydrocarbons, aromatics, and isomers thereof.

As used herein, and unless otherwise specified, liquid petroleum gas ("LPG") refers to a hydrocarbon composition, for example, a fraction of a hydrocarbon product stream, comprising propane and butane (including n-butane and iso-butane).

As used herein, and unless otherwise specified, the term "aromatic" refers to unsaturated cyclic hydrocarbons having a delocalized conjugated π system and having from six to thirty carbon atoms (e.g., aromatic $C_6$-$C_{30}$ hydrocarbon). Example aromatics include, but are not limited to, benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. Additionally, an aromatic hydrocarbon may comprise one or more heteroatoms. Examples of heteroatoms include, but are not limited to, nitrogen, oxygen, and/or sulfur. Aromatics with one or more heteroatom include, but are not limited to, thiophene, benzothiophene, oxazole, thiazole and the like, and combinations thereof. The aromatic may comprise monocyclic, bicyclic, tricyclic, and/or polycyclic rings (in any embodiment, at least monocyclic rings, only monocyclic and bicyclic rings, or only monocyclic rings) and may be fused rings. As used herein, the plural use of "xylenes" and grammatical variations thereof is used to convey that the xylene may be any isomer of xylene, including m-xylene, o-xylene, p-xylene, or blends thereof.

As used herein, the term "olefin," alternatively referred to as "alkene," refers to an unsaturated hydrocarbon chain of two to about twelve carbon atoms in length containing at least one carbon-to-carbon double bond. The olefin may be straight chain or branched chain. Non-limiting examples include ethylene, propylene, butylene, and pentene. "Olefin" is intended to embrace all structural isomeric forms of olefins.

As used herein, and unless otherwise specified, the term "paraffin," alternatively referred to as "alkane," refers to a saturated hydrocarbon chain of one to about thirty carbon atoms in length, such as, but not limited to, methane, ethane, propane and butane. The paraffin may be straight-chain, cyclic or branched-chain. "Paraffin" is intended to embrace all structural isomeric forms of paraffins. The term "acyclic paraffin" refers to straight-chain or branched-chain paraffins. The term "isoparaffin" refers to branched-chain paraffins and the term "n-paraffin" or "normal paraffin" refers to straight-chain paraffins.

As used herein, and unless otherwise specified, the term "naphthene" refers to a cycloalkane (also known as a cycloparaffin) having from three to thirty carbon atoms. Examples of naphthenes include, but are not limited to, cyclopropane, cyclobutane, cyclopentane, cyclohexane, cycloheptane, cyclooctane, and the like. The term naphthene encompasses single-ring naphthenes and multi-ring naphthenes. The multi-ring naphthenes may have two or more rings (e.g., two-rings, three-rings, four-rings, five-rings, six-rings, seven-rings, eight-rings, nine-rings, and ten-rings). The rings may be fused and/or bridged. The naphthene can also include various side chains, particularly one or more alkyl side chains of one to ten carbons.

As used herein, "feedstock" and "feed" are used interchangeably and both (as well as grammatical variations thereof) refer to a composition that is fed into a reforming reactor as the hydrocarbon feed stream. A feedstock may optionally have been pre-treated to modify its disposition.

As used herein, "hydrocarbon feed stream" (and grammatical variations thereof) refers to a composition that is fed into a reforming reactor. As used herein, intermediate hydrocarbon stream refers to a hydrocarbon effluent from each of the plurality of reaction zones that is being conveyed to a subsequent reaction zone. As used herein, hydrocarbon product stream refers to the effluent of the last or final reaction zone in sequence. As used herein, "hydrocarbon stream" refers to any of the hydrocarbon feed stream, any intermediate hydrocarbon stream, or the hydrocarbon product stream.

As used herein, the term "full-range naphtha" (and grammatical variations thereof) refers to a middle boiling range hydrocarbon fraction or fractions, typically including three or more hydrocarbons (e.g., between four and twelve carbon atoms), which are major components of gasoline, and having a boiling range characterized by a $T_5$-$T_{95}$ range of 10° C. to 232° C., where T5 defines the temperature at which 5% of the hydrocarbon composition boils and $T_{95}$ defines the temperature at which 95% of the hydrocarbon composition boils. Boiling range may be determined by simulated distillation ("SimDis") according to ASTM D2887-18. Full-range naphtha comprises "light" naphtha and "heavy" naphtha. Light naphtha is the lighter fraction of full-range naphtha having a boiling point less than about 90° C. The fraction of full-range naphtha having a boiling point greater than about 90° C. is considered heavy naphtha. Unless otherwise specified, Full-range naphtha refers to a composition comprising both heavy and light naphtha. Unless otherwise specified, "naphtha," refers to a composition that falls within the boiling point range boundaries of full-range naphtha and may have the same $T_5$-$T_{95}$ range as full-range naphtha or may have different $T_5$ and/or $T_{95}$ temperatures than full-range naphtha. Naphtha may comprise full-range naphtha, light naphtha, heavy naphtha, or any other contemplated fraction defined by a subset of hydrocarbons having, for example, a defined $T_5$ and/or $T_{95}$ temperature, a defined molecular weight range, a defined number of hydrocarbons, and the like. Naphtha may include paraffins, olefins, naphthenes, and/or aromatics.

As used herein, "reaction zone" (and grammatical variations thereof) refers to any defined region in which a chemical reaction occurs, for example, a catalyst bed. A reactor may comprise one or more reaction zones. Alternatively, multiple reactors may each comprise one or more reaction zones.

As used herein, "reactor," and grammatical derivatives thereof, refers to a vessel comprising one or more catalyst beds. A reactor inlet refers to a conduit that conveys a hydrocarbon stream to that reactor. Unless specified otherwise, all reactor temperatures refer to an equivalent isothermal (EI) temperature. Example experiments were performed in an isothermal reactor having a defined inlet temperature. Commercial reactors, however, are typically adiabatic and reactor temperature is controlled in a different manner. In adiabatic reactors, a temperature profiled may be specified that results in an average temperature across the entire reactor equivalent to a specified isothermal reactor temperature.

As used herein, the term "straight run naphtha" (also termed "virgin naphtha") refers to petroleum naphtha obtained directly from fractional distillation. As used herein, the term "fluid catalytic cracker (FCC) naphtha" refers to naphtha produced by the well-known process of fluid catalytic cracking. The term FCC naphtha is intended to encompass one or more of light cut naphtha (LCN), intermediate cut naphtha (ICN), and heavy cut naphtha (HCN). As used herein, the term "coker naphtha" refers to naphtha produced by the well-known process of coking in one or more coker units or cokers. Coker naphtha generally includes more sulfur and/or nitrogen than straight run naphtha. As used herein, the term "delayed coker naphtha" refers to naphtha produced by the well-known process of delayed coking. As used herein, the term "fluid coker naphtha" refers to naphtha produced by the well-known process of fluid coking. As used herein, the term "hydrocrackate" refers to a naphtha cut of a hydrocracker byproduct. As used herein, the term "hydrotreated naphtha" refers to naphtha produced by the well-known process of hydrotreating. As used herein, the term "steam cracker naphtha (SCN)" refers to naphtha produced by the well-known process of steam cracking.

A common method for characterizing the octane rating of a composition is to use Research Octane Number (RON). As used herein, "octane rating" and "RON" are used interchangeably, and both refer to the RON of the $C_{5+}$ fraction of a product stream. Although various methods are available for determining RON, in the claims below, references to Research Octane Number (RON) correspond to RON determined as described in Ghosh, P. et al. (2006) "Development of Detailed Gasoline Composition-Based Octane Model," *Ind. Eng. Chem. Res.*, 45(1), pp 337-345, which is hereby incorporated by reference with respect to calculating RON from gas chromatography data. As used herein, "high octane" is meant to describe a hydrocarbon composition having a RON of at least about 80, at least about 85, at least about 90, at least about 95, at least about 99, or about 100; or in a range of about 80 to about 100, about 90 to about 100, or about 95 to about 100. RON is used herein, particularly in the examples, as a surrogate for conversion. In any reforming reaction, a higher RON can be achieved by pushing the reaction forward with more severe operating conditions or longer run times. However, in doing so, the yield of desirable products in a hydrocarbon product stream is sacrificed. Thus, advantages are realized here in the simultaneous production of a hydrocarbon product stream having a high yield of desirable products (e.g., $C_{5+}$ hydrocarbons, aromatics) and that desirable fraction having a high octane-rating (RON).

The relative paraffin, aromatic, and naphthene content of a hydrocarbon feedstock may be described by its N+2A value, which is the naphthene content (wt. %) plus twice the aromatic content (wt. %). A higher N+2A value will have more naphthenes and aromatics where as a lower N+2A number will have more paraffins.

As used herein, the term "conditions effective to" refers to conditions to which a hydrocarbon feed stream may be subjected that results in a hydrocarbon product stream having a desired yield and/or octane rating. Conditions may include temperature, pressure, reaction time, and the like, which are conditions known to those of ordinary skill in the art with benefit of this disclosure.

Advantages of the modified zeolitic catalysts as described herein may be apparent in the high yield of desired products or product fractions in a hydrocarbon product stream derived from a modified zeolitic catalyst, especially when compared to conventional reforming catalysts such as chlorided alumina. As used herein, and unless otherwise specified, "percent yield" or "yield" is the total weight of the specified product divided by the total weight of the hydrocarbon feed stream and converted to a percent.

As used herein, the term "coke," and grammatical variations thereof, refers to carbonaceous material that deposits on the surface, including within the pores, of a catalyst (e.g., a modified zeolitic catalyst). The formation of coke on the catalyst surface decreases the availability of active sites for the reforming reactions to take place. Thus, as coke builds up over time, the quality of the resulting product stream may decrease. Measures of product stream quality (e.g., octane rating, yield) are used herein as an indirect measure of coke formation on a modified zeolitic catalyst.

Unless otherwise indicated, all numbers expressing quantities of ingredients, properties such as molecular weight, reaction zone operating conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments described herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Methods and Systems for Converting Hydrocarbons

Methods and systems for converting hydrocarbons that utilize one or more modified zeolitic catalysts in a plurality of functionally distinctive catalyst ("FDC") beds to convert a hydrocarbon feed stream into a hydrocarbon product stream are provided herein. Each of the plurality of FDC beds is designed to perform one or more of the various reforming reactions (e.g., dehydrogenation, dehydrocyclization, isomerization). Each of the plurality of FDC beds includes a reforming catalyst selective for one or more of the various reforming reactions. The arrangement of the FDC beds with respect to one another advantageously leads to formation of a high-octane product stream with a high yield of $C_{5+}$ hydrocarbons. By using the methods and systems disclosed herein, one may configure a reforming unit having a plurality of FDC beds to efficiently convert a wide variety of hydrocarbon product streams, for example, those derived from feedstocks containing both paraffins and naphthenes of varying molecular weights, into an economically valuable product.

Provided herein are systems that include a system for converting hydrocarbons, wherein the system comprises: a hydrocarbon feed stream; an intermediate hydrocarbon feed stream comprising not more than about 34 wt. % naphthenes; a hydrocarbon product stream comprising at least one product selected from the group consisting of high-octane gasoline, xylenes, benzene, and toluene, wherein when the hydrocarbon product stream has a RON of about 95, the $C_{5+}$ fraction yield is at least about 80 wt. %; a plurality of functionally distinctive catalyst beds arranged in sequence, wherein at least one of the functionally distinctive catalyst beds is constructed and arranged to accept the intermediate feed stream and comprises a first modified zeolitic catalyst comprising a zeolite, a transition metal, and optionally a binder, a hydrocarbon feed inlet constructed and arranged to convey the hydrocarbon feed stream to the plurality of sequential functionally distinctive catalyst beds, and a hydrocarbon product outlet constructed and arranged to accept the hydrocarbon product stream leaving the plurality of functionally distinctive catalyst beds.

Provided herein are methods that include a method for converting hydrocarbons comprising: providing a hydrocarbon feed stream; contacting the hydrocarbon feed stream with a first functionally distinctive catalyst bed under a first set of conditions, providing a first intermediate hydrocarbon stream having a naphthene content of not more than about 34 wt. %; contacting the first intermediate hydrocarbon stream with a second functionally distinctive catalyst bed under a second set of conditions; and producing a hydrocarbon product stream comprising at least one product selected from the group consisting of high-octane gasoline, xylenes, toluene, and benzene, wherein at least one of the first or second functionally distinctive catalyst beds comprises a first modified zeolitic catalyst comprising a zeolite, a transition metal, and optionally a binder, and wherein when the hydrocarbon product stream has a RON of about 95, the $C_{5+}$ fraction yield is at least about 80 wt. %.

Methods for Converting Hydrocarbons

A hydrocarbon feed stream may be conveyed through a plurality of FDC beds such it contacts each of the FDC beds under conditions effective to convert the hydrocarbon feed stream into a hydrocarbon product stream. Each FDC bed comprises a reforming catalyst having activity and selectivity towards one or more of the various reforming reactions. At least one of the FDC beds includes a modified zeolitic catalyst comprising a zeolite, a transition metal, and optionally a binder. A resulting product stream may comprise one or more of high-octane gasoline, benzene, xylenes, and toluene.

A plurality of FDC beds may be configured in a serial order such that, for example, a hydrocarbon feed stream is conveyed through a first FDC bed after which it is conveyed through a second FDC bed after which it is optionally conveyed through a third FDC bed. The order of the FDC beds may be chosen to favor, for example, paraffin-to-aromatic conversion while minimizing unfavorable reactions. For example, for a hydrocarbon feed stream comprising paraffins, naphthenes, and aromatics may be conveyed to a first FDC bed comprising a reforming catalyst selective towards dehydrogenation, effectively converting the naphthenes to aromatics. The resulting second intermediate hydrocarbon stream may be conveyed to a second FDC bed selective towards dehydrocyclization, effectively converting the paraffins to aromatics. The resulting second intermediate hydrocarbon stream may be rich in aromatics but also may include some residual paraffins, as dehydrocyclization tends to be a slow reaction. The second intermediate hydrocarbon stream may then be conveyed to a third FDC bed selective towards paraffin isomerization. Optionally, a third FDC bed may be absent if sufficient paraffin conversion is achieved in a second FDC bed. Optionally, a third FDC bed may comprise a reforming catalyst selective towards another reforming reaction, such as, but not limited to, dealkylation, dehydrogenation, or demethylation.

Systems for Converting Hydrocarbons

A system for performing the methods disclosed herein is also provided. A plurality of FDC beds may each contain a reforming catalyst that has been specifically designed and/or chosen for its selectivity towards one or more of the various reforming reactions. In every embodiment, at least one of the FDC beds contains a modified zeolitic catalyst as described herein.

A reforming unit may be configured to accept a hydrocarbon feed stream through an inlet to convey the hydrocarbon feed stream through a first FDC bed under conditions effective to convert the hydrocarbon feed stream to a first intermediate hydrocarbon stream. The reforming system may comprise a first conduit that fluidly connects the first FDC bed to a second FDC bed and through which the first intermediate hydrocarbon stream may be conveyed to the second FDC bed. The second catalyst bed may be operated under conditions effective to convert the first intermediate hydrocarbon stream to a second intermediate hydrocarbon stream. The reforming system may comprise a second conduit that fluidly connects the second FDC bed to a third catalyst bed and through which the second intermediate hydrocarbon stream may be conveyed to the third FDC bed from the second FDC bed. The third FDC bed may be operated under conditions effective to convert the second intermediate hydrocarbon stream to a hydrocarbon product stream. A hydrocarbon product stream may be conveyed through the third conduit to a separation stage where the hydrocarbon product stream may be separated into various hydrocarbon fractions, such as, but not limited to, $C_1$-$C_4$ hydrocarbons, LPG, $C_{5+}$ hydrocarbons, $C_{7+}$ hydrocarbons, aromatics, and any combination thereof. The separation stage may isolate hydrogen from the third catalyst bed effluent, optionally conveying it to a compressor and recycling it back to a location upstream of a reactor. The separation stage may include one or more separation processes, each of which may be, for example, extraction, distillation, membrane separation, aromatic/saturate separation, or any combination thereof.

Each of the plurality of FDC beds may be fixed beds, moving beds, or a combination thereof. Optionally, there may be one or more heating stages comprising one or more heaters before a first FDC bed and between each of the subsequent FDC beds.

Optionally, the third FDC bed may be absent, in which the second intermediate hydrocarbon stream is the same as the hydrocarbon product stream. Optionally, there may be one or more FDC beds subsequent to the third FDC bed through which the effluent of the third FDC bed may be conveyed, producing additional intermediate hydrocarbon streams before yielding a hydrocarbon product stream.

Optionally, the first conduit and second conduit may not be physical tubing or piping but rather a defined space between adjacent FDC beds. For example, in a stacked bed configuration, each FDC bed may be arranged one on top of another, optionally separated with inert material. In such instances, a first and second conduit may be the space occupied by the inert material. When inert material is absent, a first and second conduit may be the interfacial boundary between FDC beds. In such instances, one FDC bed may overlap with an adjacent FDC bed. For example, there may be some catalyst blending at an interfacial boundary of two FDC beds. The blending of catalysts within or at the interface between two functionally distinctive catalyst beds may be inadvertent or intentional.

An example system for converting hydrocarbons is shown in FIG. 1. In FIG. 1, a plurality of fixed FDC beds 103, 104, 105 are stacked in a single reactor 110. FIG. 1 illustrates a reforming unit 100 comprising a pre-treatment stage 108, a heater 102, a reactor 110, a separation stage 106, and a compressor 107. A hydrocarbon feed stream 101 may be combined with a recycled hydrogen stream 118 and conveyed to a pre-treatment stage 108 to modify the disposition of the hydrocarbon feed stream 101 for compatibility with downstream processes. For example, a pre-treatment stage 108 may modify the sulfur content, the nitrogen content, and/or remove any water from the hydrocarbon feed stream 101. A waste stream 122 (which may comprise water, ammonia, hydrogen sulfide, and the like) may be separated from the pre-treatment stage effluent 109, which may then be conveyed to a heater 102 to generate a warmed hydrocarbon feed stream 111. The warmed hydrocarbon feed stream 111 may then be conveyed through a first FDC bed 103 in the reactor 110, generating a first FDC bed effluent 112. The first FDC effluent 112 may then be conveyed back through the heater 102 generating a warmed first FDC bed effluent 113, which may then be conveyed through a second FDC bed 104, resulting in a second FDC bed effluent 114. The second FDC bed effluent 114 may then be conveyed back through the heater 102, generating a warmed second FDC bed effluent 115, which may then be conveyed through a third FDC bed 105, resulting in a third FDC bed effluent 116. The third FDC bed effluent 116, comprising a hydrocarbon product stream, may be conveyed to a separation stage 106. At the separation stage 106, a hydrogen stream 117 may be isolated from the hydrocarbon product stream and conveyed to a compressor 107 to be recycled back into the system through a recycled hydrogen stream 118. The hydrocarbon product stream may be separated into two or more components 120, 121, for example, $C_1$-$C_4$ hydrocarbons, LPG, $C_{5+}$ hydrocarbons, $C_{7+}$ hydrocarbons, aromatics, and any combination thereof. The separation stage may include one or more separation processes, each of which may be, for example, extraction, distillation, membrane separation, aromatic/saturate separation, or any combination thereof.

In any embodiment, the third FDC bed 105 may be absent. In such instances, the second FDC bed effluent comprises the hydrocarbon product stream. In any embodiment, there may be more than three FDC beds. In such instances, the third FDC bed effluent comprises a third intermediate hydrocarbon stream and the hydrocarbon product stream will be present in the effluent of a final FDC bed.

FIG. 1 depicts the recycled hydrocarbon stream 118 joining the treated hydrocarbon feed stream 101, however, in any embodiment, the recycled hydrogen stream 118 may be reintroduced into the system at any location prior to the reactor 110 or fed directly into the reactor 110. Additionally, the recycled hydrogen stream 118 may not be entirely derived from hydrogen produced within the reforming unit of which it is part, but in any embodiment, the recycled hydrogen stream 118 may be supplemented with hydrogen from another source (e.g., commercially available hydrogen or hydrogen from another reforming unit).

Figure 2:
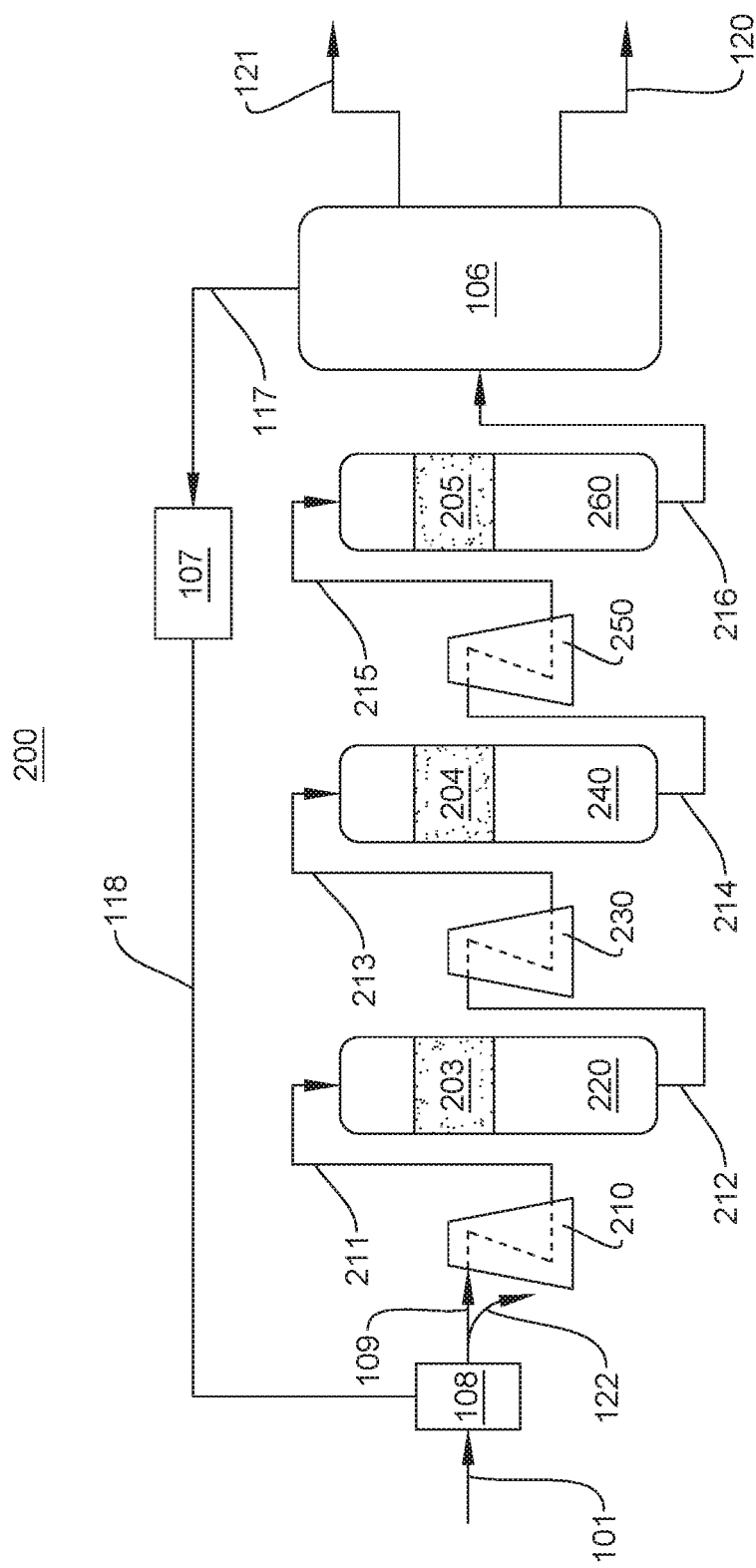
FIG. 2 illustrates an example reforming system comprising a series of separate reactors each comprising one or more functionally distinctive catalyst beds, one of which comprises a modified zeolitic catalyst as described herein, to convert a hydrocarbon feed stream.

Alternatively, each of the plurality of FDC beds may be in a separate reactor wherein one reactor is configured in series with a next reactor, for example, in a semi-regenerative catalytic reformer unit or a cyclic regeneration reformer unit. For example, FIG. 2 depicts an example system for converting hydrocarbons comprising multiple reactors. In FIG. 2, all like numbers from FIG. 1 represent like components. FIG. 2 depicts a reforming unit 200 having three reactors 220, 240, 260 and three heaters 210, 230, 250 between each reactor. A hydrocarbon feed stream 101 may be conveyed through a pre-treatment stage 108, then to a first heater 210 to generate a heated hydrocarbon feed stream 211, which may be conveyed through a first FDC bed 203 in a first reactor 220, generating a first reactor effluent 212. The reactor effluent 212 may then be conveyed through a second heater 230, generating a heated first reactor effluent 213. The heated first reactor effluent may then be conveyed through a second FDC bed 204 in a second reactor 240, generating a second reactor effluent 214. The second reactor effluent 214 may be conveyed through a third heater 250, generating a heated second reactor effluent 215, which may then be conveyed through a third FDC bed 205 in a third reactor 260, generating a third reactor effluent 216. The third reactor effluent 216, comprising a hydrocarbon product stream, may then be conveyed to a separation stage 106. At the separation stage 106, a hydrogen stream 117 may be isolated from the hydrocarbon product stream and conveyed to a compressor 107 to be recycled back into the system through a recycled hydrogen stream 118. The hydrocarbon product stream may be separated into two or more components 120, 121, for example, $C_1$-$C_4$ hydrocarbons, LPG, $C_{5+}$ hydrocarbons, $C_{7+}$ hydrocarbons, aromatics, and any combination thereof. The separation stage may include one or more separation processes, each of which may be, for example, extraction, distillation, membrane separation, aromatic/saturate separation, or any combination thereof.

In any embodiment, a reforming unit may comprise a single heater through which the fist reactor effluent 212, second reactor effluent 214, and third reactor effluent 216 may be conveyed, rather than a system comprising three separate heaters, such as shown in FIG. 2.

While a single FDC bed is shown in each of the three reactors in FIG. 2, it is envisioned that any reactor may comprise two or more FDC beds, for example, in a stacked configuration; thereby utilizing both series and stacked configurations. While not shown, the reforming unit 200 shown in FIG. 2 may optionally have a swing reactor, for example, as would be the case in a cyclic regeneration reforming unit.

In any embodiment, the third reactor 205 may be absent. In such instances, the second reactor effluent 214 comprises the hydrocarbon product stream and may be conveyed directly to a separation stage 106. Optionally, there may be more than three reactors. In such instances, the third reactor effluent 216 may be conveyed to subsequent reactors, in series, wherein the effluent of the last reactor comprises the hydrocarbon product stream.

As in FIG. 1, FIG. 2 depicts the recycled hydrocarbon stream 118 joining the treated hydrocarbon feed stream 101, however, in any embodiment, the recycled hydrogen stream 118 may be reintroduced into the system at any location prior to the first reactor 220 or fed directly into any of the reactors 220, 240, 260. Additionally, the recycled hydrogen stream 118 may not be entirely derived from hydrogen produced within the reforming unit of which it is part, but in any embodiment, the recycled hydrogen stream 118 may be supplemented with hydrogen from another source (e.g., commercially available hydrogen or hydrogen from another reforming unit).

In any embodiment, a reforming unit may be further capable of regenerating a FDC catalyst. For example, the reforming unit may be a cyclic reforming unit or a semi-regenerative reforming unit. The modified zeolitic catalyst, as will be described in detail below, may be resistant to the presence of nitrogen and to coking. For example, a hydrocarbon feed stream may contain up to about 1000 ppm basic nitrogen without detrimental effects to the modified zeolitic catalyst's activity. Thus, a modified zeolitic catalyst provide particular advantages to cyclic reforming units and semi-regenerative reforming units as these types of units typically require more frequent offline catalyst regeneration than (more expensive) reforming units such as continuous catalyst regeneration reforming units.

Hydrocarbon Feed Stream

The methods and systems described herein may be suitable for converting a hydrocarbon feed stream comprising one or more of a naphtha feedstock, a fraction thereof (e.g., light naphtha, heavy naphtha), and a feedstock comprising $C_6$-$C_8$ hydrocarbons. A suitable hydrocarbon feed stream may have a boiling range characterized by a $T_5$-$T_{95}$ range of about 10° C. to about 232° C. Examples of suitable full-range naphtha (or naphtha fractions) include, but are not limited to, hydrotreated naphtha, fluid catalytic cracker (FCC) naphtha, straight run naphtha, coker naphtha, delayed coker naphtha, fluid coker naphtha, and a blend thereof. A hydrocarbon feed stream comprising $C_6$-$C_8$ hydrocarbons may include, but are not limited to, $C_6$-$C_8$ paraffins, $C_6$-$C_8$ naphthenes, $C_6$-$C_8$ aromatics, or combinations thereof.

For example, the systems and methods disclosed herein may be particularly advantageous for converting a hydrocarbon feed stream having a substantial naphthenic fraction, a substantial paraffinic fraction, or substantial fractions of both naphthenes and paraffins. A hydrocarbon stream may comprise, for example, at least about 30 wt. %, at least about 45 wt. %, at least about 50 wt. %, at least about 60 wt. %, at least about 70 wt. %, at least about 80 wt. %, at least about 90 wt. %, at least about 95 wt. %, at least about 99 wt. % or about 100 wt. %; or in a range of about 45 wt. % to about 100 wt. %, about 50 wt. % to about 100 wt. %, about 60 wt. % to about 100 wt. %, about 70 wt. % to about 100 wt. %, about 90 wt. % to about 100 wt. %, or about 95 wt. % to about 100 wt. % paraffins. In any embodiment, a paraffin fraction may comprise, consist essentially of, or consist of $C_4$-$C_{12}$ paraffins. In any embodiment, a paraffin fraction may comprise, consist essentially of, or consist of $C_6$-$C_8$ paraffins. In any embodiment, a hydrocarbon feed stream may comprise a majority (e.g., about 50 wt. % to about 100 wt. %, about 75 wt. % to about 100 wt. %, or about 90 wt. % to about 100 wt. %) heptane or may comprise all heptane (e.g., greater than about 99 wt. % or about 100 wt. %).

A hydrocarbon stream may comprise, for example, at least about 30 wt. %, at least about 45 wt. %, at least about 50 wt. %, at least about 60 wt. %, at least about 70 wt. %, at least about 80 wt. %, at least about 90 wt. %, at least about 95 wt. %, at least about 99 wt. % or about 100 wt. %; or in a range of about 45 wt. % to about 100 wt. %, about 50 wt. % to about 100 wt. %, about 60 wt. % to about 100 wt. %, about 70 wt. % to about 100 wt. %, about 90 wt. % to about 100 wt. % or about 95 wt. % to about 100 wt. % naphthenes. A hydrocarbon stream may be characterized by an N+2A value of less than about 90, less than about 80, less than about 70, less than about 60, less than about 50, or less than about 40.

Reaction Zones

The methods described herein may further comprise providing hydrogen to one or more reaction zones (e.g., FDC beds). Operating conditions in each reaction zone, reactor, and/or FDC catalyst bed may be any suitable conditions known in the art for effectively converting a hydrocarbon feed stream to a hydrocarbon product stream. Operating conditions in each of the one or more reaction zones, reactors, and/or FDC catalyst beds may be the same or different and may depend on the properties of a hydrocarbon feed stream, a desired product stream, and/or constraints of a particular reactor configuration.

Suitable conditions for any of the one or more reactors include, independently, a pressure of about 15 psig (170 kPa) to about 1500 psig (10340 kPa) and an $H_2$:hydrocarbon ratio ($H_2$:HC) of about 0.1:1 to about 10:1. The reactor/s, reaction zone/s, and/or FDC catalyst beds may have a (combined) weight hourly space velocity (WHSV) of about 0.1 hours$^{-1}$ to about 15 hours$^{-1}$. The EI temperature of any reactor may be about 400° C. to about 750° C.

As noted above, the modified zeolitic catalysts, as will be described in detail below, may be resistant to coking. Thus, more severe reaction conditions that favor formation of high-octane gasoline and/or BTX (e.g., higher temperature, lower pressure, lower WHSV, lower $H_2$:HC ratio) may be utilized in the systems and methods described herein. For example, one (or more) of the reactor/s may be held at an EI temperature of about 500° C. or greater. One or more of the reactors may be held at a pressure of about 150 psig (1030 kPa) to about 215 psig (1480 kPa). One or more of the reaction zone/s, reactor/s, and/or FDC catalyst beds may be held at a WHSV of about 1 hours$^{-1}$. One or more of the reactors may have an $H_2$:HC ratio of about 1.5:1 to about 2.5:1. Such reaction zone operating conditions, when employed with conventional Pt/Re chlorided catalysts, result in increased coke formation and rapid catalyst deactivation. The modified zeolitic catalysts disclosed herein do not have the same restrictions and thus, overall, perform better than conventional reforming catalysts. Thus, by using more severe reaction conditions, a hydrocarbon product stream having a high $C_{5+}$ fraction yield with a high octane rating may be produced.

A hydrocarbon stream may be conveyed through each of the plurality of reaction zone/s, reactor/s, and/or FDC beds such that the hydrocarbon stream has the same or different residence time in each. Relative residence time in each reactor may be controlled by modifying reactor size.

Hydrocarbon Product Streams

When a hydrocarbon feed stream comprises naphtha, the hydrocarbon product stream derived therefrom may comprise, consist essentially of, or consist of aromatics and isoparaffin hydrocarbons (i.e., upgraded naphtha). A hydrocarbon product stream or fractions thereof (e.g., the $C_{5+}$ fraction) may have a higher octane rating than the hydrocarbon feed stream from which it is derived. For example, a $C_{5+}$ fraction of a hydrocarbon product stream may have an octane rating of at least about 80, at least about 85, at least about 90, at least about 95, at least about 99, or about 100; or in a range of about 80 to about 100, about 90 to about 100 or about 95 to about 100. A hydrocarbon product stream or fractions thereof may be further blended with other streams, such as a gasoline source.

When a hydrocarbon feed stream comprises $C_4$-$C_{12}$ hydrocarbons, the hydrocarbon product stream derived therefrom may comprise $C_4$-$C_{12}$ aromatics. A hydrocarbon product stream may include at least about 30 wt. %, at least about 50 wt. %, at least about 70 wt. %, at least about 90 wt. %, at least about 99 wt. % or about 100 wt. %; or in a range of about 30 wt. % to about 100 wt. %, about 50 wt. % to about 100 wt. %, about 70 wt. % to about 100 wt. %, about 30 wt. % to about 90 wt. % or about 50 wt. % to about 70 wt. % $C_4$-$C_{12}$ aromatics.

When a hydrocarbon feed stream comprises $C_6$-$C_8$ hydrocarbons, the hydrocarbon product stream derived therefrom may comprise $C_6$-$C_8$ aromatics. A hydrocarbon product stream may include at least about 30 wt. %, at least about 50 wt. %, at least about 70 wt. %, at least about 90 wt. %, at least about 99 wt. % or about 100 wt. %; or in a range of about 30 wt. % to about 100 wt. %, about 50 wt. % to about 100 wt. %, about 70 wt. % to about 100 wt. %, about 30 wt. % to about 90 wt. % or about 50 wt. % to about 70 wt. % $C_6$-$C_8$ aromatics. A hydrocarbon product stream may comprise a majority (e.g., greater than about 50 wt. %, greater than about 75 wt. %, greater than about 90 wt. %) benzene or may comprise all benzene (e.g., greater than about 99 wt. % or about 100 wt. %). Alternatively, a hydrocarbon product stream may comprise a majority (e.g., about 50 wt. % to about 100 wt. %, about 75 wt. % to about 100 wt. %, or about 90 wt. % to about 100 wt. %) toluene or may comprise substantially all toluene (e.g., greater than about 99 wt. % or about 100 wt. %). Alternatively, a hydrocarbon product stream may comprise a majority (e.g., about 50 wt. % to about 100 wt. %, about 75 wt. % to about 100 wt. %, or about 90 wt. % to about 100 wt. %) $C_8$ aromatics (e.g., ethylbenzene, xylenes) or may comprise substantially all $C_8$ aromatics (e.g., greater than about 99 wt. % or about 100 wt. %).

Unlike the zeolitic catalysts described in the background, which produce primarily benzene and toluene, a modified zeolitic catalyst may also produce xylenes. Further, whereas chlorided alumina catalysts produce $C_{9+}$ aromatics, which have limited commercial value compared to $C_6$-$C_8$ aromatics, a modified zeolitic catalyst tends to yield more $C_6$-$C_8$ aromatics.

Suitable Modified Zeolitic Catalysts for the Disclosed Systems and Methods

The modified zeolitic catalysts for use in the methods and systems described herein includes a modified zeolite and at least one transition metal.

A modified zeolitic catalyst as disclosed herein may be prepared from a zeolite, herein referred to as a "precursor zeolite" or a "zeolite." As used herein, "precursor zeolite," "zeolite," or "zeolitic" (and grammatical variations thereof) are defined to refer to a crystalline material having a porous framework structure built from tetrahedral atoms connected by bridging oxygen atoms. A precursor zeolite is modified to produce a modified zeolite as described herein, which is subsequently converted to a modified zeolitic catalysts disclosed herein. Thus, the modified zeolites are precursor zeolites that have been treated in such a way that the one or more of the bulk silica-to-alumina ratio and framework silica-to-alumina ratio is increased relative to the precursor zeolite bulk silica-to-alumina ratio and framework silica-to-alumina ratio.

Examples of known zeolite frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases, each which is incorporated by reference herein with respect to its disclosure of zeolitic frameworks and methods for their preparation. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework. A zeolite may be referred to by the number of tetrahedral atoms (exclusive of oxygen atoms) that define pore openings in the zeolite. For example, a precursor zeolite may be an 8-member ring zeolite, a 10-member ring zeolite, or a 12-member ring zeolite. Preferably, a precursor zeolite is a 12-member ring zeolite. A precursor zeolite may be a three-dimensional zeolite. Examples of suitable precursor zeolites include zeolites having a FAU, LTL, BEA, MAZ, MTW, MEI, MOR, or EMT-FAU intermediate framework structure. Examples of suitable precursor zeolites having an FAU framework structure include, but are not limited to, USY (or dehydrated USY), Na—X (or dehydrated Na—X), LZ-210, Li-LSX, zeolite X, and zeolite Y. Examples of suitable precursor zeolites having an LTL framework structure include, but are not limited to, zeolite L, gallosillicate L, LZ-212 and perlialite. Examples of suitable precursor zeolites having a BEA framework structure include, but are not limited, to Beta, Al-rich Beta, CIT-6, and pure silica Beta. Examples of suitable precursor zeolites having an MAZ framework structure include, but are not limited to, mazzite, LZ-202, and ZSM-4. Examples of suitable precursor zeolites having an MTW framework structure include, but are not limited to, ZSM-12, CZH-5, NU-13, TPZ-12, Theta-3, and VS-12. Examples of suitable precursor zeolites having an MEI framework structure include, but are not limited to, ZSM-18 and ECR-40. Examples of suitable precursor zeolites having an MOR framework structure include, but are not limited to, Ca-Q, LZ-211, mordenite, and Na-D. Examples of suitable precursor zeolites having an EMT-FAU intermediate structure include, but are not limited to, CSZ-1, ECR-30, ECR-32, ZSM-20, and ZSM-3. A precursor zeolite may be a zeolite L, zeolite Y, or USY. A person of ordinary skill in the art knows how to make the aforementioned frameworks.

Zeolites, being an aluminosilicate material, has a framework silica-to-alumina ratio and bulk silica-to-alumina ratio. As used herein, "bulk silica-to-alumina ratio" refers to the silica-to-lumina ratio of a zeolite inclusive of alumina within and outside the framework (extra-framework alumina). As used herein, "framework silica-to-alumina ratio" refers to the silica-to-alumina ratio of a zeolite of tetrahedrally coordinated alumina within the framework and exclusive of alumina outside the framework (extra-framework alumina, which is typically octahedrally coordinated). The bulk silica-to-alumina ratio, framework silica-to-alumina ratio, and extra-framework metal oxide content, unless otherwise indicated, are measured on a modified zeolitic catalyst (defined below) after all modifications, for example, after steaming, silicone selectivation, and/or acid/base washing of a precursor zeolite. Framework silica-to-alumina ratio may be measured by solid state NMR. Bulk silica-to alumina ratio may be measured by any elemental analysis technique, for example, inductively coupled plasma atomic emission spectroscopy or inductively coupled plasma mass spectrometry.

Processes for treating the precursor zeolites to produce modified zeolites include, for example, steaming the zeolitic catalyst precursor. In such processes, the precursor zeolite may be steamed in an atmosphere comprising steam at a temperature of about 750° F. (398.9° C.) to about 3000° F. (1649° C.), about 1000° F. (537.8° C.) to about 2000° F. (1093° C.), or about 1500° F. (815.6° C.) to about 1800° F. (982.2° C.). The atmosphere can include as little as about 1 vol. % water and up to about 100 vol. % water. The zeolitic catalyst precursor can be exposed to steam for any convenient period of time, such as about 10 minutes to about 48 hours. In particularly useful examples, the zeolitic catalyst precursor is steamed for about 1 hour to about 5 hours at a temperature of about 1500° F. (815.6° C.) to about 1800° F. (982.2° C.), which includes about 1500° F. (815.6° C.), about 1600° F. (871.1° C.), about 1700° F. (926.7° C.), and about 1800° F. (982.2° C.).

A precursor zeolite may be steamed multiple times, if desired. If steamed multiple times, each stream treatment can occur with other steps performed between steam treatments, for example, acid washing. Typical acid leaching conditions can include using a suitable acid, such oxalic acid, citric acid, or nitric acid, in concentrations ranging from about 0.1 molar up to about 10 molar, preferably about 1 molar, at a temperature ranging from about 20° C. up to about 100° C.

A modified zeolitic catalyst may favor dehydrocyclization and/or isomerization of paraffins over other reforming reactions such as, but not limited to, cracking and dealkylation. A modified zeolitic catalyst may have enhanced activity for dehydrocyclization when it comprises a modified zeolite having a high bulk silica-to-alumina ratio, for example, at least about 40:1 (e.g., about 40:1 to about 10000:1) or at least about 80:1 (e.g., about 80:1 to about 10000:1). A modified zeolite may have a high framework silica-to-alumina ratio, for example, at least about 80:1 (e.g., about 80:1 to about 20000:1), at least about 500:1 (e.g., about 500:1 to about 20000:1), or at least about 2000:1 (e.g., about 2000:1 to about 20000:1). In one example, a modified zeolite has a framework silica-to-alumina ratio of at least about 500:1 or about 2000:1.

A modified zeolite may be treated with a source of one or more transition metals to form a modified zeolitic catalyst described herein. A modified zeolitic catalyst may include at least about 0.01 wt. %, at least about 0.05 wt. %, at least about 0.25 wt. %, at least about 1 wt. %, at least about 2.5 wt. %, at least about 5 wt. %, at least about 10 wt. %, or in a range from about 0.01 wt. % to about 10 wt. %, about 0.01 wt. % to about 5.0 wt. %, 0.01 wt. % to 2.5 wt. %, about 0.01 wt. % to about 1 wt. %, about 0.01 wt. % to about 0.25 wt. %, about 0.01 wt. % to about 0.05 wt. %, about 0.05 wt. % to about 10 wt. %, about 0.05 wt. % to about 5.0 wt. %, about 0.05 wt. % to about 2.5 wt. %, about 0.05 wt. % to about 1 wt. %, about 0.05 wt. % to about 0.25 wt. %, about 0.25 wt. % to 10 wt. %, about 0.25 wt. % to about 5 wt. %, about 0.25 wt. % to about 1 wt. %, about 1 wt. % to about 10 wt. %, about 1 wt. % to about 5 wt. %, about 1 wt. % to about 2.5 wt. %, about 2.5 wt. % to about 10 wt. %, about 2.5 wt. % to about 5 wt. %, or about 5 wt. % to about 10 wt. % transition metal, based on the total weight of the modified zeolitic catalyst. For example, a modified zeolitic catalyst may include about 0.9 wt. % of a transition metal. The transition metal may be a Group 10 transition metal, for example, nickel (Ni), palladium (Pd), platinum (Pt), or a combination thereof. Exemplary sources of platinum include, but are not limited to, tetraamine platinum (II) nitrate, tetraamine platinum hydroxide, chloroplatinic acid, and the like. Typical methods for incorporation of a metal include impregnation (such as by incipient wetness), ion exchange, deposition by precipitation, and any other convenient method for depositing a metal.

Optionally, a modified zeolite or precursor zeolitic catalyst may be combined with a support or binder material (both are referred to as a "binder" herein) to form a modified zeolitic catalyst. A modified zeolitic catalyst may include from about 1 wt. % to about 10 wt. %, about 1 wt. % to about 20 wt. %, about 1 wt. % to about 30 wt. %, about 1 wt. % to about 40 wt. %, about 1 wt. % to about 50 wt. %, about 1 wt. % to about 60 wt. %, about 1 wt. % to about 70 wt. %, about 1 wt. % to about 80 wt. %, about 1 wt. % to about 90 wt. %, about 1 wt. % to about 99 wt. %, about 10 wt. % to about 20 wt. %, about 10 wt. % to about 30 wt. %, about 10 wt. % to about 40 wt. %, about 10 wt. % to about 50 wt. %, about 10 wt. % to about 60 wt. %, about 10 wt. % to about 70 wt. %, about 10 wt. % to about 80 wt. %, about 10 wt. % to about 90 wt. %, about 10 wt. % to about 99 wt. %, about 20 wt. % to about 30 wt. %, about 20 wt. % to about 40 wt. %, about 20 wt. % to about 50 wt. %, about 20 wt. % to about 60 wt. %, about 20 wt. % to about 70 wt. %, about 20 wt. % to about 80 wt. %, about 20 wt. % to about 90 wt. %, about 20 wt. % to about 99 wt. %, about 30 wt. % to about 40 wt. %, about 30 wt. % to about 50 wt. %, about 30 wt. % to about 60 wt. %, about 30 wt. % to about 70 wt. %, about 30 wt. % to about 80 wt. %, about 30 wt. % to about 90 wt. %, about 30 wt. % to about 99 wt. %, about 40 wt. % to about 50 wt. %, about 40 wt. % to about 60 wt. %, about 40 wt. % to about 70 wt. %, about 40 wt. % to about 80 wt. %, about 40 wt. % to about 90 wt. %, about 40 wt. % to about 99 wt. %, about 50 wt. % to about 60 wt. %, about 50 wt. % to about 70 wt. %, about 50 wt. % to about 80 wt. %, about 50 wt. % to about 90 wt. %, about 50 wt. % to about 99 wt. %, about 60 wt. % to about 70 wt. %, about 60 wt. % to about 80 wt. %, about 60 wt. % to about 90 wt. %, about 60 wt. % to about 99 wt. %, about 70 wt. % to about 80 wt. %, about 70 wt. % to about 90 wt. %, about 70 wt. % to about 99 wt. %, about 80 wt. % to about 90 wt. %, about 80 wt. % to about 99 wt. %, or about 90 wt. % to about 99 wt. % binder based on total weight of the modified zeolitic catalyst. A suitable modified zeolite-to-binder ratio may be about 10:1, about 4:1, about 2:1, about 1:1, about 1:2, about 1:4, or about 1:10.

Examples of suitable binders include other zeolites, other inorganic materials such as clays and metal oxides such as alumina, silica, silica-alumina, titania, zirconia, Group 1 metal oxides, Group 2 metal oxides, and combinations thereof. Clays may be kaolin, bentonite, and montmorillonite and may be sourced commercially. They may be blended with other materials such as silicates. Other suitable binders may include binary porous matrix materials (such as silica-magnesia, silica-thoria, silica-zirconia, silica-beryllia and silica-titania), and ternary materials (such as silica-alumina-magnesia, silica-alumina-thoria and silica-alumina-zirconia). One or more binders may be used in a modified zeolitic catalyst described herein, for example, silica and alumina may be used in combination. Preferably, however, the binder is silica.

Optionally, one or more promoters may be present in a modified zeolitic catalyst described herein. For example, a modified zeolitic catalyst may include at least about about 0.005 wt. % to about 10 wt. %, about 0.005 wt. % to about 5 wt. %, about 0.005 wt. % to about 1 wt. %, about 0.005 wt. % to about 0.5 wt. %, about 0.005 wt. % to about 0.01 wt. %, about 0.01 wt. % to about 10 wt. %, about 0.01 wt. % to about 5 wt. %, about 0.01 wt. % to about 1 wt. %, about 0.01 wt. % to about 0.5 wt. %, about 0.5 wt. % to about 10 wt. %, about 0.5 wt. % to about 5 wt. %, about 0.5 wt. % to about 1 wt. %, about 1 wt. % to about 10 wt. %, about 1 wt. % to about 5 wt. %, or about 5 wt. % to about 10 wt. % of a promoter based on total weight of the modified zeolitic catalyst. The promoter may be a Group 3 metal, a Group 4 metal, a Group 5 metal, a Group 6 metal, a Group 7 metal, a Group 8 metal, a Group 9 metal, a Group 10 metal, a Group 11 metal, a Group 13 metal, and a Group 14 metal. Examples of promoters include, but are not limited to, scandium (Sc), tin (Sn), vanadium (V), chromium (Cr), manganese (Mn), iron (Fe), cobalt (Co), nickel (Ni), zinc (Zn), palladium (Pd), gallium (Ga), iridium (Ir), indium (In), germanium (Ge), rhodium (Rh), ruthenium (Ru), and copper (Cu). Promoters may be incorporated from about 0.005 wt. % to about 15 wt. % by any method well known in the art, for example, impregnation, Muller addition, ion exchange, and the like.

Optionally, the zeolite in a modified zeolitic catalyst may be present at least partly in hydrogen form. Optionally, a modified zeolitic catalyst may include one or more selectivating agents. As used herein, a selectivating agent refers to an agent that prevents unwanted activity derived from sites on the zeolite's external surface. A selectivating agent may also be introduced to introduce diffusional limitations to a modified zeolitic catalyst. For example, the selectivating agent may contain silicone.

Optionally, a modified zeolitic catalyst may include one or more selectivating agents to introduce diffusional limitations to a modified zeolitic catalyst. Silicone selectivation can be performed with any suitable silicone oil or from an organic silica source such as tetraethyl orthosilicate (TEOS). As used herein, a selectivating agent refers to an agent that prevents unwanted activity derived from sites on the modified zeolite's external surface.

A zeolitic catalyst precursor may be calcined, reduced (e.g., in $H_2$) and/or sulfided by methods well known in the art to yield a modified zeolitic catalyst. Sulfidation can be performed by any convenient method, such as gas phase sulfidation or liquid phase sulfidation.

As used herein, modified zeolitic catalyst, and grammatical variations thereof, refers to a catalyst prepared from a precursor zeolite by adjusting the acidity of a precursor zeolite to form a modified zeolite. The precursor zeolite's acidity is multi-faceted, and may be indicated by one or more of its alpha value, collidine uptake, Bronsted acid site density, ratio of Bronsted-to-Lewis acid sites, and ammonia adsorption/desorption. Structurally, these properties may be influenced by one or more of the framework silica-toalumina ratio, bulk silica-to-alumina ratio, and the presence of Group 1 and Group 2 metals, among others. As used herein, a modified zeolitic catalyst has a small alpha value, a low collidine uptake, or both. For example, a modified zeolitic catalyst as described herein may have an alpha value of less than or equal to about 100, less than or equal to about 50, less than or equal to about 25, less than or equal to about 10, less than or equal to about 5, less than or equal to 3, less than or equal to about 2, less than or equal to about 1. Preferably, a modified zeolite catalyst has an alpha value from about 0 to about 10, from about 0 to about 3, or from about 0 to about 2. A modified zeolitic catalyst may have a collidine uptake from about 0 µmol/g equal to about 100 µmol/g, from about 0 µmol/g to about 50 µmol/g, from about 0 µmol/g to about 40 µmol/g, from about 0 µmol/g to about 10 µmol/g, or from about 0 µmol/g to about 2 µmol/g.

A modified zeolitic catalyst may favor dehydrocyclization of paraffins over other reforming reactions such as, but not limited to, isomerization, cracking, and dealkylation. Such modified zeolitic catalysts will be referred to herein as "dehydrocyclization enhanced zeolitic catalysts" or "DEZ" catalysts. A modified zeolitic catalyst may favor dehydrocyclization and isomerization of paraffins over other reforming reactions such as, but not limited to, cracking and dealkylation. Such modified zeolitic catalysts will be referred to herein as "isomerization enhanced zeolitic catalysts" or "IEZ" catalysts. Specific properties of each are discussed below. Depending on the desired function of a particular catalyst bed, at least one of a DEZ catalyst or an IEZ catalyst is included in a FDC bed in the systems and methods disclosed herein.

Suitable DEZ Catalysts

A modified zeolitic catalyst's activity for dehydrocyclization may be enhanced by adjusting the zeolitic framework and/or bulk silica-to-alumina ratio of the zeolite precursor from which the DEZ catalyst is made. A modified zeolite useful in the preparation of a DEZ catalyst may have a high bulk silica-to-alumina ratio, for example, at least about 40:1, at least about 80:1, at least about 350:1, or at least about 400:1. Preferably, the bulk silica-to-alumina ratio in a modified zeolite for subsequent preparation of a DEZ catalyst is at least about 350:1 (e.g., about 350:1 to about 10000:1) or at least about 400:1 (e.g., about 400:1 to about 10000:1). The modified zeolite in a DEZ catalyst may have a high framework silica-to-alumina ratio, for example, at least about 500:1 (e.g., about 500:1 to about 20000:1), or at least about 2000:1 (e.g., about 2000:1 to about 20000:1). Preferably, the modified zeolite in a DEZ catalyst has a framework silica-to-alumina ratio of at least about 2000:1. When preparing a DEZ catalyst, for example, the steaming and/or acid washing conditions may be more severe than when preparing, for example, an IEZ catalyst.

A DEZ catalyst may optionally include a Group 1 or Group 2 metal cation. Suitable Group 1 metals include, but are not limited to, lithium (Li), sodium (Na), potassium (K), rubidium (Rb), and cesium (Ce). Suitable Group 2 metals include beryllium (Be), magnesium (Mg), calcium (Ca), strontium (Sr), and barium (Ba). For example, a modified zeolitic catalyst may include, based on total weight of the modified zeolitic catalyst, about 0.005 wt. % to about 10 wt. %, about 0.005 wt. % to about 5 wt. %, about 0.005 wt. % to about 1 wt. %, about 0.005 wt. % to about 0.5 wt. %, about 0.005 wt. % to about 0.01 wt. %, about 0.01 wt. % to about 10 wt. %, about 0.01 wt. % to about 5 wt. %, about 0.01 wt. % to about 1 wt. %, about 0.01 wt. % to about 0.5 wt. %, about 0.5 wt. % to about 10 wt. %, about 0.5 wt. % to about 5 wt. %, about 0.5 wt. % to about 1 wt. %, about 1 wt. % to about 10 wt. %, about 1 wt. % to about 5 wt. %, or about 5 wt. % to about 10 wt. % of a Group 1 or Group 2 metal based on total weight of the modified zeolitic catalyst. These may be incorporated into the DEZ catalyst by any conventional method known in the art, for example, ion exchange, impregnation, Muller addition, and the like.

A DEZ catalyst may have an acidity, as measured by alpha value, of less than about 2 or less than about 1; or from about 0 to about 2 or from about 0 to about 1. A DEZ catalyst may have an acidity, as measured by collidine uptake, of less than about 3 µmol/g (or from about 0 µmol/g to about 3 µmol/g) or, more preferably, less than about 2 µmol/g, or from about 0 µmol/g to about 2 µmol/g.

IEZ Catalysts

A modified zeolitic catalyst's activity for isomerization may be enhanced by adjusting the framework and/or bulk silica-to-alumina ratio in the zeolitic catalyst precursor from which an IEZ catalyst is made. An IEZ catalyst may have a high bulk silica-to-alumina ratio, for example, at least about 40:1 or at least about 80:1. The bulk silica-to-alumina ratio for an IEZ catalyst may be lower than the bulk silica-to-alumina ratio for a DEZ catalyst. An IEZ catalyst may have a high framework silica-to-alumina ratio, for example, at least about 200:1 (e.g., about 200:1 to about 20000:1), or at least about 500:1 (e.g., about 500:1 to about 20000:1). Preferably, an IEZ catalyst has a framework silica-to-alumina ratio of at least about 200:1 or about 500:1. The framework silica-to-alumina ratio for an IEZ catalyst may be the same or lower than the framework silica-to-alumina ratio of a DEZ catalyst.

An IEZ catalyst may include one or more extra-framework metal oxides at a weight percent, based on the IEZ catalyst weight, of about 0.05 wt. % to about 5 wt. % metal oxide. The extra-framework metal oxide may be present as extracted framework metal oxides not fully removed from the zeolitic catalyst precursor from which it is derived or may be present as intentionally added metal oxide (e.g., through impregnation, ion exchange, Muller addition). Suitable extra-framework metal oxides include, but are not limited to, alumina, titania, gallia, zirconia, boron oxide, niobium oxide, tungsten oxide, and combinations thereof. Preferably, the metal oxide comprises alumina.

An IEZ catalyst may have an acidity, as measured by alpha value, of less than about 2 (e.g., from about 0 to about 2) or less than about 1 (e.g., from about 0 to about 1). An IEZ catalyst may have an acidity, as measured by collidine uptake, of less than about 40 µmol/g, including less than about 10 µmol/g, less than about 15 µmol/g, less than 20 µmol/g, less than about 25 µmol/g, less than about 30 µmol/g, or less than about 35 µmol/g; this includes from about 0 µmol/g to about 40 µmol/g, about 0 µmol/g to about 10 µmol/g, about 0 µmol/g to about 15 µmol/g, about 0 µmol/g to about 20 µmol/g, about 0 µmol/g to about 25 µmol/g, about 0 µmol/g to about 30 µmol/g, or about 0 µmol/g to about 35 µmol/g. Preferably, an IEZ catalyst has a collidine uptake of between about 10 µmol/g and about 40 µmol/g.

It is believed that the high framework and bulk silica-to-alumina ratios in the DEZ and IEZ catalysts enhances the catalyst's dehydrocyclization activity with respect to undesired reforming reactions such as cracking. It is further believed that isomerization activity may be imparted to an IEZ catalyst by creating extra-framework alumina. It is believed that extra-framework metal oxides contribute less to paraffin cracking and naphthene dealkylation than contributions from framework metal oxides (i.e., alumina). This may be due to steps and corners present on small metal oxide crystals trapped in an IEZ catalyst's cavities or on the external surface of an IEZ catalyst. Thus, IEZ catalysts, having a high framework silica-to-alumina ratio as well as extra-framework metal oxides, favor dehydrocyclization and isomerization while minimizing cracking and dealkylation.

Advantages of utilizing a modified zeolitic catalyst in a multiple bed configuration may be realized, at least in part, in the ability to configure the plurality of FDC beds to efficiently convert highly paraffinic and/or highly naphthenic hydrocarbon feed stream to valuable products. This is believed to be due to the increased dehydrocyclization activity of a modified zeolitic catalyst and augmented by the ability to tune isomerization activity. IEZ and DEZ modified zeolitic catalysts as described herein may be particularly beneficial when used in combination with other reforming catalysts selective for other reforming reactions (e.g., dehydrogenation, dealkylation).

Example Methods

An example method using a system comprising three FDC beds will now be described with respect to conversion of a hydrocarbon feed stream comprising naphthenes and paraffins; however, one of ordinary skill in the art with the benefit of this disclosure would be able to modify the configuration to optimize conversion of any feedstock to produce a desired product stream.

A hydrocarbon feed stream comprising full-range naphtha may be conveyed to a first FDC bed selective for dehydrogenation, rapidly dehydrogenated to aromatics and producing a first intermediate hydrocarbon stream having a lower naphthene content than the hydrocarbon feed stream. To accomplish this conversion, the first FDC bed may comprise, for example, a transition metal on any solid support, for example, platinum, nickel, ruthenium, or palladium, any of which may be supported, for example, on silica or alumina. Any catalyst known in the art to be efficient at dehydrogenation will suffice for a first FDC bed. For example, one or more transition metals loaded onto a support (e.g., Pt/Re Cl—$Al_2O_3$) may be used.

The first intermediate hydrocarbon stream may be conveyed to a second FDC bed to convert paraffins to aromatics, resulting in a second intermediate hydrocarbon stream. To accomplish this conversion, the second FDC bed may comprise, for example, a catalyst selective for dehydrocyclization of paraffins. For example, the catalyst may be a DEZ catalyst as described herein. Notably, it has been found that while a DEZ catalyst has enhanced paraffin dehydrocyclization activity, it also catalyzes naphthene ring opening generating paraffins, which is undesirable when generating a product stream intended for use as motor gasoline. Thus, a hydrocarbon stream conveyed to an FDC bed comprising a DEZ catalyst preferably has a naphthene content of not more than about 34 wt. %, not more than about 30 wt. %, not more than about 25 wt. %, not more than about 20 wt. %, not more than about 15 wt. %, not more than about 10 wt. %, not more than about 5 wt. %, or not more than about 1 wt. %, which includes about 0 wt. % to about 34 wt. %, about 0 wt. % to about 30 wt. %, about 0 wt. % to about 25 wt. %, about 0 wt. % to about 20 wt. %, about 0 wt. % to about 15 wt. %, about 0 wt. % to about 10 wt. %, and about 0 wt. % to about 5 wt. %.

The second intermediate hydrocarbon stream may be enriched in aromatics, having both a lower naphthene and paraffin content than the hydrocarbon feed stream. Optionally, the second intermediate hydrocarbon stream may be conveyed to a third FDC bed. For example, dehydrocyclization of paraffins tends to be a slow reaction when using a zeolitic catalyst and a second intermediate stream may have still have paraffin content. Thus, a third FDC bed may be included to convert those paraffins into aromatics and isoparaffins. While not wishing to be bound by theory, at some point in a third bed, chemical equilibrium may be reached at which aromatic yield may not be substantially increased. Ideally, any paraffins remaining may then be converted to isoparaffins, for example, by a third catalyst efficient at isomerization. Preferably, the third catalyst does not have high cracking activity as cracking reduces $C_{5+}$ fraction yield. For example, the third FDC be may comprise an IEZ catalyst as disclosed herein.

Thus, in using the systems and methods exemplified above, both paraffins and naphthenes in a hydrocarbon product stream are efficiently converted to aromatics and unwanted side reactions, such as naphthene ring opening, cracking, and isomerization at the expense of dehydrocyclization, are minimized.

In addition to the advantages outlined above, the modified zeolitic catalysts disclosed herein may be tolerant of sulfur in a hydrocarbon feed stream, particularly when rhenium is absent from the modified zeolitic catalyst. Whereas the presence of sulfur typically drives down product stream yield derived from a chlorided alumina catalyst, modified zeolitic catalyst disclosed herein and discussed in the Examples do not suffer the same effects. For example, a modified zeolitic catalyst may be compatible with a hydrocarbon feed stream having up to about 50 ppm sulfur, for example, having a no measurable sulfur content to about 50 ppm sulfur, including about 0.5 ppm to about 10 ppm, about 1 ppm to about 10 ppm, about 1.5 ppm to about 10 ppm, and about 1.5 ppm to about 50 ppm.

To facilitate a better understanding of the present invention, the following examples of preferred or representative embodiments are given. In no way should the following examples be read to limit, or to define, the scope of the invention.

Example Embodiments

One nonlimiting example embodiment is a system for converting hydrocarbons, wherein the system comprises: a hydrocarbon feed stream; an intermediate hydrocarbon feed stream comprising not more than about 34 wt. % naphthenes; a hydrocarbon product stream comprising at least one product selected from the group consisting of high-octane gasoline, xylenes, benzene, and toluene, a first functionally distinctive catalyst bed and a second functionally distinctive catalyst bed arranged in sequence, wherein at least one of the functionally distinctive catalyst beds is constructed and arranged to accept the intermediate feed stream and comprises a first modified zeolitic catalyst comprising a first modified zeolite, a first transition metal, and optionally a first binder, and a hydrocarbon feed inlet constructed and arranged to convey the hydrocarbon feed stream to the first functionally distinctive catalyst bed, and a hydrocarbon product outlet constructed and arranged to accept the hydrocarbon product stream. Optionally, the embodiment can further include one or more of the following: Element 1: the system wherein the first and second functionally distinctive catalyst beds are stacked catalyst beds inside a single reactor; Element 2: the system comprising a first reactor comprising the first functionally distinctive catalyst bed and a second reactor comprising the second functionally distinctive catalyst bed; Element 3: the system wherein the hydrocarbon feed stream comprises full-range naphtha; Element 4: the system wherein the intermediate hydrocarbon stream comprises a naphthene content of not more than about 5 wt. %; Element 5: the system wherein at least one of the first or second functionally distinctive catalyst beds comprises a dehydrogenating catalyst; Element 6: the system wherein the first functionally distinctive catalyst bed comprises a dehydrogenation catalyst and the second functionally distinctive catalyst bed comprises the first modified zeolitic catalyst, wherein the first modified zeolitic catalyst has a framework silica-to-alumina ratio of at least about 2000:1; Element 7: the system wherein the system further comprises a third functionally distinctive catalyst bed downstream of the second functionally distinctive catalyst bed, wherein the third functionally distinctive catalyst bed comprises the second modified zeolitic catalyst, and wherein the second modified zeolitic catalyst has a bulk silica-to-alumina ratio less than the bulk silica-to-alumina ratio of the first modified zeolitic catalyst; Element 8: the system wherein the second modified zeolitic catalyst has a collidine uptake greater than the first modified zeolitic catalyst; Element 9: the system wherein one or both of the first modified zeolitic catalyst and the second modified zeolitic catalyst has a framework silica-to-alumina ratio of at least about 500:1; Element 10: the system wherein one or both of the first modified zeolitic catalyst and the second modified zeolitic catalyst has a framework silica-to-alumina ratio of at least about 2000:1; Element 11: the system wherein one or both of the first modified zeolitic catalyst and the second modified zeolitic catalyst further comprises a Group 1 or Group 2 metal cation; Element 12: the system wherein one or both of the first modified zeolitic catalyst and the second modified zeolitic catalyst comprises about 0.05 wt. % to about 5 wt. % extra-framework metal oxide; Element 13: the system wherein one or both of the first modified zeolitic catalyst and the second modified zeolitic catalyst comprises about 0.05 wt. % to about 5 wt. % extra-framework alumina; Element 14: the system wherein one or both of the first transition metal and second transition metal comprises platinum; Element 15: the system wherein the first modified zeolitic catalyst comprises about 0.05 wt. % to about 10 wt. % transition metal; Element 16: the system wherein one or both of the first modified zeolitic catalyst and the second modified zeolitic catalyst is characterized by a bulk silica-to-alumina ratio of about 80:1 or greater and/or a framework silica-to-alumina ratio of about 80:1 or greater; Element 17: the system wherein one or both of the first modified zeolitic catalyst and the second modified zeolitic catalyst has a bulk silica-to-alumina ratio of about 400:1 or greater; Element 18: the system wherein one or both of the first modified zeolitic catalyst and the second modified zeolitic catalyst is characterized by an alpha value of less than about 10; Element 19: the system wherein one or both of the first modified zeolitic catalyst and the second modified zeolitic catalyst is characterized by an alpha value of less than about 3; Element 20: the system wherein one or both of the first modified zeolitic catalyst and the second modified zeolitic catalyst is characterized by an alpha value of less than about 2; Element 21: the system wherein one or both of the first modified zeolitic catalyst and the second modified zeolitic catalyst comprises a 12-member ring zeolite; Element 22: the system wherein one or both of the first modified zeolitic catalyst and the second modified zeolitic catalyst comprises a three-dimensional 12-member ring zeolite; Element 23: the system wherein one or both of the first modified zeolitic catalyst and the second modified zeolitic catalyst comprises a framework classified by IZA code FAU or BEA; Element 24: the system wherein one or both of the first modified zeolitic catalyst and the second modified zeolitic catalyst comprises a beta or USY zeolite; Element 25: the system wherein one or both of the first modified zeolitic catalyst and the second modified zeolitic catalyst comprises a USY zeolite; Element 26: the system wherein one or both of the first modified zeolitic catalyst and the second modified zeolitic catalyst comprises at least one promoter in the amount of about 0.01 wt. % to about 10 wt. % selected from the group consisting of Pd, Sc, Ti, V, Cr, Mn, Fe, Co, Ni, Cu, Re, Ga, Ir, In, Rh, Zn, Na, K, Ca, Ba, and Sr; Element 27: the system wherein one or both of the first and second binder comprises silica; and Element 28: the system further comprising a second modified zeolitic catalyst comprising a second modified zeolite, a second transition metal, and optionally a second binder. Examples of combinations include, but are not limited to, Element 1 in combination with one or more of Elements 3-28; Element 2 in combination with one or more of Elements 3-28; Element 3 in combination with one or more of Elements 4-28; Element 4 in combination with one or more of Elements 5-28; Element 5 in combination with one or more of Elements 6-28; Element 6 in combination with one or more of Elements 7-28; Element 7 in combination with one or more of Elements 8-28; Element 8 in combination with Element 28 and one or more of Elements 9-27; Element 9 in combination with one or more of Elements 10-28; Element 10 in combination with one or more of Elements 11-28; Element 11 in combination with one or more of Elements 12-28; Element 11 in combination with one or more of Elements 12-28; Element 12 in combination with one or more of Elements 13-28; Element 13 in combination with one or more of Elements 14-28; Element 14 in combination with one or more of Elements 15-28; Element 15 in combination with one or more of Elements 16-28; Element 16 in combination with one or more of Elements 17-28; Element 17 in combination with one or more of Elements 18-28; Element 18 in combination with one or more of Elements 19-28; Element 19 in combination with one or more of Elements 20-28; Element 20 in combination with one or more of Elements 21-28; Element 21 in combination with one or more of Elements 22-28; Element 22 in combination with one or more of Elements 23-28; Element 23 in combination with one or more of Elements 24-28; Element 24 in combination with one or more of Elements 25-28; Element 25 in combination with one or more of Elements 26-28; Element 26 in combination with one or more of Elements 27 and 28; Element 27 in combination with Element 28; Element 1 in combination with Element 3; Element 1 in combination with Elements 3 and 4; Element 1 in combination with Elements 3-5; Element 1 in combination with Elements 3-6; Element 1 in combination with Elements 3-7; Element 1 in combination with Elements 3-8; Element 1 in combination with Elements 3-8 and 25; Element 2 in combination with Element 3; Element 1 in combination with Elements 3 and 4; Element 2 in combination with Elements 3-5; Element 2 in combination with Elements 3-6; Element 2 in combination with Elements 3-7; Element 2 in combination with Elements 3-8; and Element 2 in combination with Elements 3-8 and 25.

Another nonlimiting example is a method for converting hydrocarbons comprising: providing a hydrocarbon feed stream; conveying the hydrocarbon feed stream through a first functionally distinctive catalyst bed under a first set of conditions; providing a first intermediate hydrocarbon stream comprising a naphthene content of not more than about 34 wt. %; conveying the first intermediate hydrocarbon stream through a second functionally distinctive catalyst bed under a second set of conditions; and producing a hydrocarbon product stream comprising at least one product selected from the group consisting of high-octane gasoline, xylenes, toluene, and benzene, wherein at least one of the first and second functionally distinctive beds comprises a first modified zeolitic catalyst comprising a zeolite, a transition metal, and optionally a binder, wherein when the hydrocarbon product stream has a RON of about 95, the $C_{5+}$ fraction yield is at least about 80 wt. %. Optionally, the embodiment can further include one or more of the following: Element 29: the method wherein the hydrocarbon feed stream comprises full-range naphtha; Element 30: the method wherein the intermediate hydrocarbon stream comprises a naphthene content of not more than about 5 wt. %; Element 31: the method wherein at least one of the first and second functionally distinctive catalyst beds comprises a dehydrogenating catalyst; Element 32: the method wherein the first functionally distinctive catalyst bed comprises a dehydrogenation catalyst and the second functionally distinctive catalyst bed comprises a first modified zeolitic catalyst having a framework silica-to-alumina ratio of at least about 2000:1; Element 33: the method further comprising a third functionally distinctive catalyst bed comprising the second modified zeolitic catalyst downstream of the second functionally distinctive catalyst bed, wherein the second modified zeolitic catalyst has a bulk silica-to-alumina ratio less than the bulk silica-to-alumina ratio of the first modified zeolitic catalyst; Element 34: the method wherein one or both of the first modified zeolitic catalyst and the second modified zeolitic catalyst has a framework silica-to-alumina ratio of at least about 500:1; Element 35: the method wherein one or both of the first modified zeolitic catalyst and the second modified zeolitic catalyst has a framework silica-to-alumina ratio of at least about 2000:1; Element 36: the method wherein one or both of the first modified zeolitic catalyst and the second modified zeolitic catalyst comprises a Group 1 or Group 2 metal cation; Element 37: the method wherein one or both of the first modified zeolitic catalyst and the second modified zeolitic catalyst comprises about 0.05 wt. % to about 5 wt. % extra-framework metal oxide; Element 38: the method wherein one or both of the first modified zeolitic catalyst and the second modified zeolitic catalyst comprises about 0.05 wt. % to about 5 wt. % extra-framework alumina; Element 39: wherein one or both of the first modified zeolitic catalyst and the second modified zeolitic catalyst comprises about 0.05 wt. % to about 10 wt. % transition metal; Element 40: wherein one or both of the first modified zeolitic catalyst and the second modified zeolitic catalyst comprises platinum; Element 41: wherein the second modified zeolitic catalyst is characterized by a greater collidine uptake than the first modified zeolitic catalyst; Element 42: wherein one or both of the first modified zeolitic catalyst and the second modified zeolitic catalyst is characterized by a bulk silica-to-alumina ratio of about 80:1 or greater and/or a framework silica-to-alumina ratio of about 80:1 or greater; Element 43: the method wherein one or both of the first modified zeolitic catalyst and the second modified zeolitic catalyst has a bulk silica-to-alumina ratio of about 400:1 or greater; Element 44: the method wherein one or both of the first modified zeolitic catalyst and the second modified zeolitic catalyst is characterized by an alpha value of less than about 10; Element 45: the method wherein one or both of the first modified zeolitic catalyst and the second modified zeolitic catalyst is characterized by an alpha value of less than about 3; Element 46: the method wherein one or both of the first modified zeolitic catalyst and the second modified zeolitic catalyst is characterized by an alpha value of less than about 2; Element 47: the method wherein one or both of the first modified zeolitic catalyst and the second modified zeolitic catalyst comprises a 12-member ring zeolite; Element 48: the method wherein one or both of the first modified zeolitic catalyst and the second modified zeolitic catalyst comprises a three-dimensional 12-member ring zeolite; Element 49: the method wherein one or both of the first modified zeolitic catalyst and the second modified zeolitic catalyst comprises a framework classified by IZA code FAU or BEA; Element 50: the method wherein one or both of the first modified zeolitic catalyst and the second modified zeolitic catalyst comprises a beta or USY zeolite; Element 51: the method wherein one or both of the first modified zeolitic catalyst and the second modified zeolitic catalyst comprises a USY zeolite; Element 52: the method wherein one or both of the first modified zeolitic catalyst and the second modified zeolitic catalyst comprises at least one promoter in the amount of about 0.01 wt. % to about 10 wt. %, the promoter selected from one or more of the group consisting of Pd, Sc, Ti, V, Cr, Mn, Fe, Co, Ni, Cu, Re, Ga, Ir, In, Rh, Zn, Na, K, Ca, Ba, and Sr. Element 53: the method wherein one or both of the first and second binder comprises silica; Element 54: the method wherein the first and second conditions independently comprise an operating pressure of about 35 psig (about 241 kPa) to about 350 psig (about 2410 kPa) and an $H_2$:HC ratio of about 1.25:1 to about 5:1; Element 55: the method wherein the first and second conditions independently comprise an $H_2$:HC ratio of not more than about 2.5:1; Element 56: the method wherein the first and second conditions independently comprise an operating pressure of not more than about 215 psig (about 1480 kPa); and Element 57: the system further comprising a second modified zeolitic catalyst comprising a second modified zeolite, a second transition metal, and optionally a second binder. Examples of combinations include, but are not limited to, Element 29 in combination with one or more of Elements 30-57; Element 30 in combination with one or more of Elements 31-57; Element 31 in combination with one or more of Elements 32-57; Element 32 in combination with one or more of Elements 33-57; Element 33 in combination with one or more of Elements 34-57; Element 34 in combination with one or more of Elements 35-57; Element 35 in combination with one or more of Elements 36-57; Element 36 in combination with one or more of Elements 37-57; Element 37 in combination with one or more of Elements 38-57; Element 38 in combination with one or more of Elements 39-57; Element 39 in combination with one or more of Elements 40-57; Element 40 in combination with Element 57 and one or more of Elements 41-55; Element 41 in combination with one or more of Elements 42-57; Element 42 in combination with one or more of Elements 43-57; Element 43 in combination with one or more of Elements 44-57; Element 44 in combination with one or more of Elements 45-57; Element 45 in combination with one or more of Elements 46-57; Element 46 in combination with one or more of Elements 47-57; Element 47 in combination with one or more of Elements 48-57; Element 48 in combination with one or more of Elements 49-57; Element 49 in combination with one or more of Elements 50-57; Element 50 in combination with one or more of Elements 51-57; Element 51 in combination with one or more of Elements 52-57; Element 52 in combination with one or more of Elements 53-57; Element 53 in combination with Element 57 and one or more of Elements 54-56; Element 54 in combination with one or more of Elements 55-57; Element 55 in combination with one or more of Elements 56-57; Element 56 in combination with Element 57; Element 29 in combination with Element 30; Element 29 in combination with Elements 30 and 31; Element 29 in combination with Elements 30-32; Element 29 in combination with Elements 30-33; Element 29 in combination with Elements 30-33 and 35; Element 29 in combination with Elements 30-33, 35, and 41; Element 29 in combination with Elements 30-33, 35, 41, and 50; Element 29 in combination with Elements 35, 41, and 50; Element 29 in to combination with Element 30 and 57; Element 29 in combination with Elements 30, 31, and 57; Element 29 in combination with Elements 30-32 and 57; Element 29 in combination with Elements 30-33 and 57; Element 29 in combination with Elements 30-33, 35, and 57; Element 29 in combination with Elements 30-33, 35, 41, and 57; Element 29 in combination with Elements 30-33, 35, 41, 50 and 57; and Element 29 in combination with Elements 35, 41, 50, and 57.

EXAMPLES

Example 1

Preparation of a DEZ Catalyst

A DEZ catalyst may be prepared by removing both framework and bulk alumina from a precursor zeolite to achieve a desired acidity. A USY precursor zeolite with FAU framework having a bulk silica-to-alumina ratio of at least 60 is extruded with silica (binder) at a ratio of 80:20 (zeolite to binder) and then steamed at about 1500° F. (815.6° C.) to about 1800° F. (982.2° C.) for about 1 hour to about 5 hours. In particularly useful preparations, a USY precursor zeolite having an alpha value of about 2 and a collidine uptake of about 11 µmol/g is steamed at 1500° F. (815.6° C.) for about 1 hour. Additionally or alternatively, a zeolitic catalyst precursor may be acid washed to reduce acidity. As noted above, preferably, the framework silica-to-alumina ratio in a DEZ catalyst is at least 500:1, more preferably 2000:1. Preferably, the bulk silica-to-alumina ratio is at least 80:1 or at least 400:1. Acidity is preferably reduced such that alpha is as low as possible, for example, below 2. Collidine uptake is preferably reduced as low as possible, preferably, below 3 µmol/g. After steaming and/or acid washing, the zeolitic catalyst precursor is impregnated with 0.9 wt. % platinum, reduced in Hz, and sulfided in 10 wt. % $H_2S$.

Alternatively or additionally, a Group 1 or Group 2 metal cation may be incorporated into a steamed or unsteamed zeolitic catalyst precursor. To prepare a DEZ catalyst having a Group 1 or Group 2 metal cation, a USY precursor zeolite with FAU framework having a bulk silica-to-framework ratio of at least 60 is extruded with silica (binder) at a ratio of 80:20 (zeolite to binder). Optionally, the zeolitic catalyst precursor is steamed at about 1500° F. (815.6° C.) to about 1800° F. (982.2° C.) for about 1 hour to about 5 hours. A Group 1 or a Group 2 metal is introduced into the extruded precursor zeolite by impregnation. Specific examples of useful Group 1 and Group 2 metals include magnesium, calcium, barium, potassium, and sodium. The zeolitic catalyst precursor is then impregnated with 0.9 wt. % platinum, reduced in Hz, and sulfided in 10 wt. % $H_2S$.

Example 2

Preparation of IEZ Catalysts

A USY precursor zeolite with FAU framework having a bulk silica-to-alumina ratio of at least 60 is extruded with silica (binder) at a ratio of 80:20 (zeolite to binder) and then steamed at about 1500° F. (815.6° C.) to about 1800° F. (982.2° C.) for about 1 hour to about 5 hours. As noted above, the framework silica-to-alumina ratio may be at least 80:1, at least 500:1, or at least 2000:1. The bulk silica-to-alumina ratio may be at least 40:1, at least 80:1, or at least 400:1. Acidity is preferably reduced such that alpha is less than 2 or less than 1. Collidine uptake is preferably reduced to be between about 10 µmol/g and 40 µmol/g. The zeolitic catalyst precursor is impregnated with 0.9 wt. % platinum, reduced in Hz, then sulfided in 10 wt. % $H_2S$.

Example 3

Preparation of Conventional Catalysts

Pt/Re chlorided alumina catalysts are prepared by loading 1 wt. % chlorine onto extruded Pt/Re on aluminum oxide having high surface area, followed by reducing in $H_2$ and sulfiding in 10 wt. % $H_2S$.

Example 4

Properties of Example Modified Zeolitic Catalysts

Data herein will be provided for different modified zeolitic catalysts prepared by a variety of methods. The precursor zeolite, referred to as USY A or USY B, has properties as shown in Table 1 below. Table 1 also reports the effects on alpha value and collidine uptake after extruding each with 80:20 zeolite: silica followed by steaming for 1 hour at either 1500° F. (815.6° C.) or 1700° F. (926.7° C.).

TABLE 1

| | Alpha | Collidine Uptake (µmol/g) |
|---|---|---|
| USY A | 2.2 | 10.9 |
| USY A, steamed 1500° F. (815.6° C.) for 1 hour | 1.7 | 1.8 |
| USY B | 12 | 99.6 |
| USY B, steamed 1700° F. (926.7° C.) for 1 hour | 0.89 | 15.3 |

Example 5

The Experimental Hydrocarbon Feed Stream

To illustrate the dehydrocyclization and isomerization activity of example modified zeolitic catalysts, a hydrocarbon feed stream having naphtha range boiling fraction is conveyed through one or more catalyst beds having one or more modified zeolitic catalysts prepared as described in Example 1 and Example 2. The hydrocarbon feed stream is n-heptane or a feedstock having the properties disclosed in Table 2 below.

TABLE 2

| Property | Value |
|---|---|
| API Gravity | 56.6 |
| Boiling Range | 120° F.-400° F. (48.9° C.-204° C.) |
| $T_5$ | 120° F. (48.9° C.) |
| $T_{95}$ | 355° F. (179° C.) |
| RON | 57 |
| Paraffins | 47.1 wt. % |

TABLE 2-continued

| Property | Value |
| --- | --- |
| Naphthenes | 34.3 wt. % |
| Aromatics | 18.6 wt. % |
| N + 2A | 71 |

The naphtha feedstock as described in Table 2 is pretreated by passing it through molecular sieve material to remove water and through a sulfur sorbent to adjust sulfur content to about 0.6 ppm.

Example 6

Reaction Zone

All catalysts are tested either in an isothermal 16-channel fixed bed unit (<1 cc catalyst) or in a fixed-bed isothermal microunit (1-5 cc catalyst). The reactor is held at a temperature of about 450° C. to about 525° C. and the reaction zone is operated at pressures of about 125 psig (862 kPa) to about 350 psig (2410 kPa), an $H_2$:HC ratio of 1.25:1 to 5:1, and a WHSV of 1 hours$^{-1}$ to 15 hours$^{-1}$. In the following examples, specific conditions within these ranges are indicated.

Example 7

Characterizing a Product Stream

Hydrocarbon product streams are analyzed by gas chromatography. Octane (RON) is calculated according to the model described by Ghosh, P. et al. (2006) "Development of Detailed Gasoline Composition-Based Octane Model." Ind. Eng. Chem. Res., 45(1), pp. 337-345.

Example 8

Improved Yield with Functionally Distinctive Catalyst Beds

Figure 3:
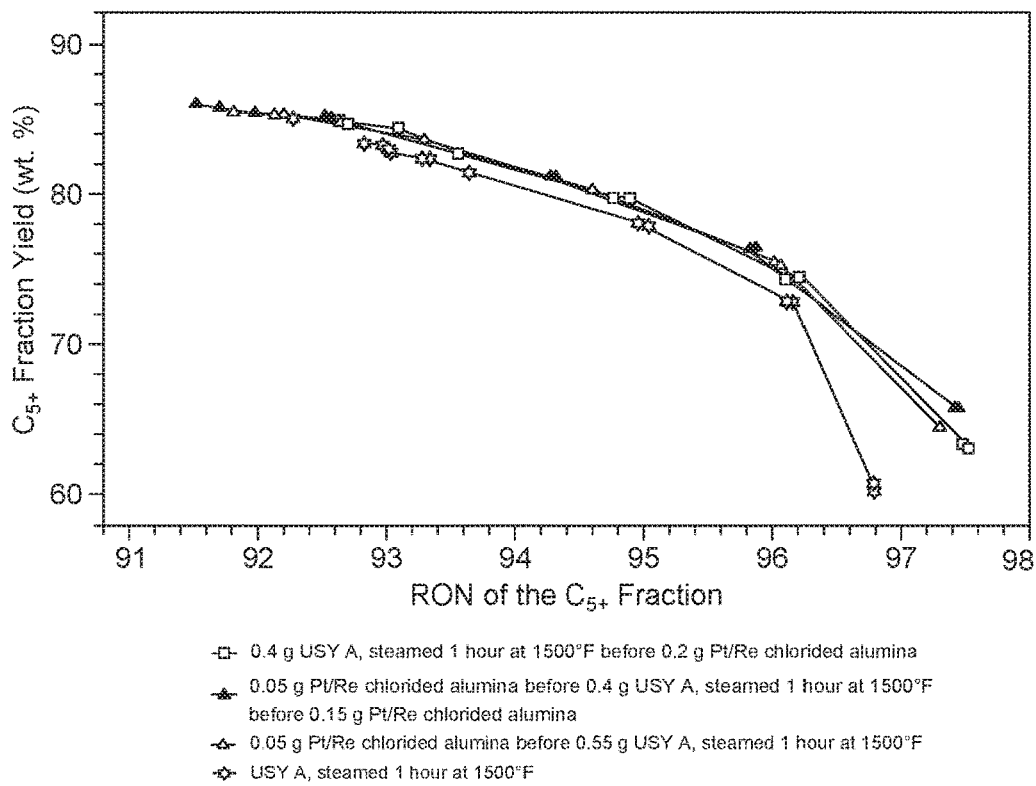
FIG. 3 provides data illustrating the improvement of the $C_{5+}$ fraction yield achieved using two and three sequential functionally distinctive catalyst beds, as discussed in the Examples.

FIG. 3 provides data relating to improved $C_{5+}$ fraction yield with respect to RON of the $C_{5+}$ fraction in a hydrocarbon product stream obtained from the following reactor configurations:

0.4 g of a modified zeolitic catalyst prepared from a USY A zeolitic catalyst precursor steamed for 1 hour at 1500° F. (815.6° C.) before 0.2 g Pt/Re chlorided alumina;

0.05 g Pt/Re chlorided alumina before 0.40 g of a modified zeolitic catalyst prepared from a USY A zeolitic catalyst precursor steamed for 1 hour at 1500° F. (815.6° C.) before 0.15 g Pt/Re chlorided alumina;

0.05 g Pt/Re chlorided alumina before 0.55 g of a modified zeolitic catalyst prepared from a USY A zeolitic catalyst precursor steamed for 1 hour at 1500° F. (815.6° C.); and a modified zeolitic catalyst prepared from a USY A zeolitic catalyst precursor steamed for 1 hour at 1500° F. (815.6° C.).

Figure 4:
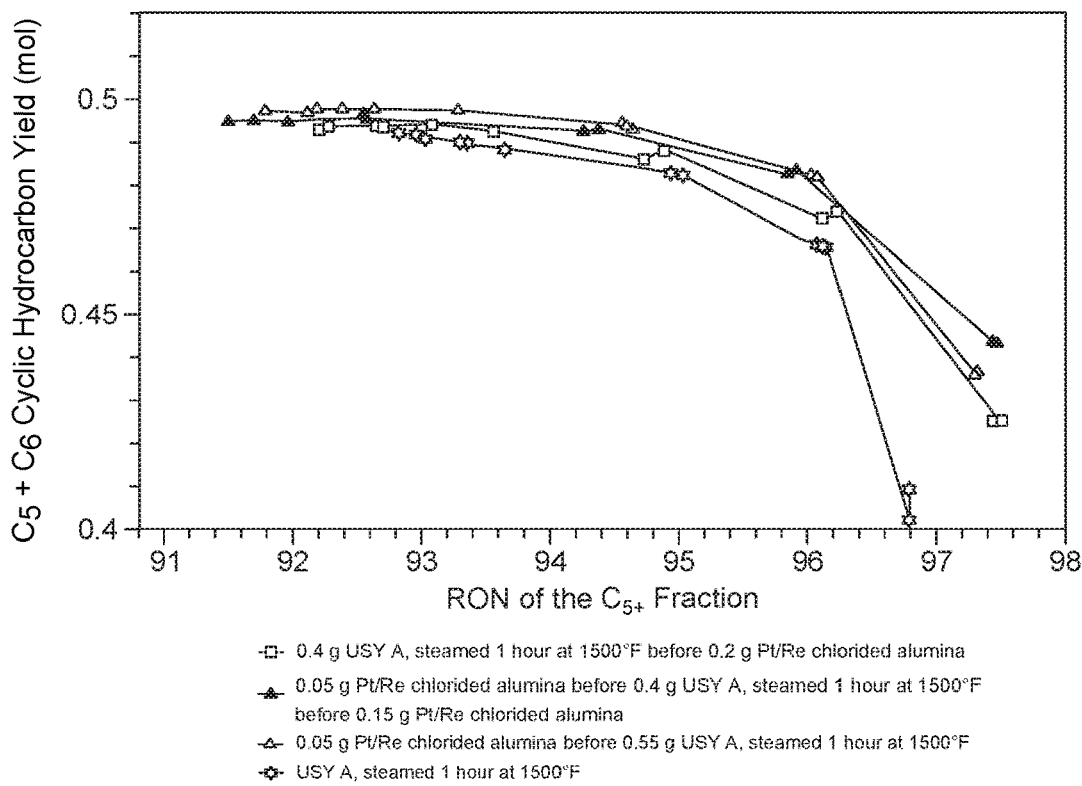
FIG. 4 provides data illustrating the improvement of the $C_5+C_6$ fraction yield achieved using two and three sequential functionally distinctive catalyst beds, as discussed in the Examples.
Figure 5:
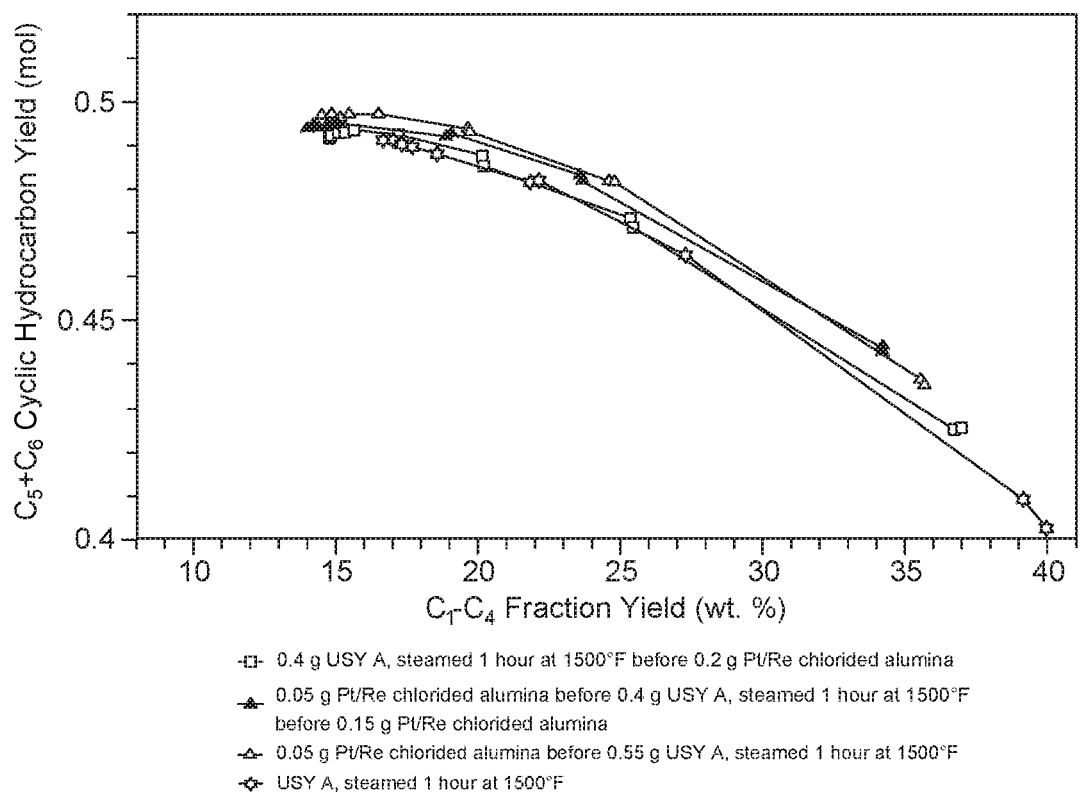
FIG. 5 provides data illustrating the improvement of the $C_5+C_6$ fraction yield at the same $C_1$-$C_4$ yield when using two and three sequential functionally distinctive catalyst beds, as discussed in the Examples.

The hydrocarbon feed stream is naphtha as described in Table 2. The reactor is operated at a temperature of 500° C., a pressure of 350 psig (2410 kPa), and an $H_2$:HC ratio of 5:1. The WHSV is varied. Notably, conveying the hydrocarbon feed streams through sequential FDC beds appears to provide a hydrocarbon product stream with a higher $C_{5+}$ fraction yield when compared to a hydrocarbon product stream obtained from a single modified zeolitic catalyst. In particular, it appears that a stacked bed having Pt/Re chlorided alumina before a modified zeolitic catalyst performs better than a stacked bed without a Pt/Re chlorided alumina catalyst. Further, it appears that a stacked bed having 0.5 g Pt/Re chlorided alumina before and 0.15 g Pt/Re chlorided alumina after a modified zeolitic catalyst performs better than a stacked bed having a Pt/Re chlorided alumina catalyst only after a modified zeolitic catalyst. Similarly, FIG. 4 provides data from the same experiment (same reactor conditions, catalyst bed configurations, and feed) relating to the effect sequential FDC beds on $C_5+C_6$ cyclic hydrocarbon yield. FIG. 5 provides data from the same experiment, but compares cyclic hydrocarbon yield to $C_1$-$C_4$ yield. At the same $C_1$-$C_4$ yield, the use of functionally distinctive beds appears to result in a product stream with higher cyclic hydrocarbon yield.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range is specifically disclosed.

What is claimed is:

1. A system for converting hydrocarbons, wherein the system comprises:
    a hydrocarbon feed stream;
    an intermediate hydrocarbon feed stream comprising not more than about 34 wt. % naphthenes;
    a hydrocarbon product stream comprising at least one product selected from the group consisting of high-octane gasoline, xylenes, benzene, and toluene, and wherein when the C5+ fraction of the hydrocarbon product stream has a RON of 95, the C5+ fraction yield is at least 80 wt. %;
    a first functionally distinctive catalyst bed and a second functionally distinctive catalyst bed arranged in sequence, wherein at least one of the functionally distinctive catalyst beds is constructed and arranged to accept the intermediate feed stream and comprises a first modified zeolitic catalyst comprising a first modified zeolite, a first transition metal, and optionally a first binder and optionally a second modified zeolitic catalyst comprising a second modified zeolite, a second transition metal, and optionally a second binder, wherein one or both of the first modified zeolite and the second modified zeolite include a bulk silica-to-alumina ratio of about 80:1 or greater, a framework silica-to-alumina ratio of about 80:1, or both;
    a hydrocarbon feed inlet constructed and arranged to convey the hydrocarbon feed stream to the first functionally distinctive catalyst bed; and a hydrocarbon product outlet constructed and arranged to accept the hydrocarbon product stream.

2. The system as in claim 1, wherein the first and second functionally distinctive catalyst beds are stacked catalyst beds inside a single reactor.

3. The system as in claim 1, wherein the hydrocarbon feed stream comprises full-range naphtha.

4. The system as in claim 1, wherein the first functionally distinctive catalyst bed comprises a dehydrogenation catalyst and the second functionally distinctive catalyst bed comprises the first modified zeolitic catalyst, and wherein one or both of the first modified zeolite and the second modified zeolite has a framework silica-to-alumina ratio of at least about 500:1.

5. The system as in claim 1, wherein the system further comprises a third functionally distinctive catalyst bed downstream of the second functionally distinctive catalyst bed, wherein the third functionally distinctive catalyst bed comprises the second modified zeolitic catalyst, and wherein the second modified zeolitic catalyst has a bulk silica-to-alumina ratio less than the bulk silica-to-alumina ratio of the first modified zeolitic catalyst.

6. The system as in claim 1, wherein one or both of the first modified zeolitic catalyst and the second modified zeolitic catalyst comprises about 0.05 wt. % to about 5 wt. % extra-framework alumina.

7. The system as in claim 1, wherein one or both of the first modified zeolitic catalyst or second modified zeolitic catalyst comprise about 0.05 wt. % to about 10 wt. % transition metal, the transition metal comprising one or more of the following elements: platinum, palladium, and nickel.

8. The system as in claim 1, wherein the second modified zeolitic catalyst has a collidine uptake greater than the first modified zeolitic catalyst.

9. The system as in claim 1, wherein one or both of the first modified zeolitic catalyst and/or the second modified zeolitic catalyst include an alpha value of less than about 3.

10. A method for converting hydrocarbons comprising:
providing a hydrocarbon feed stream;
conveying the hydrocarbon feed stream through a first functionally distinctive catalyst bed under a first set of operating conditions;
providing a first intermediate hydrocarbon stream comprising a naphthene content of not more than about 34 wt. %;
conveying the first intermediate hydrocarbon stream through a second functionally distinctive catalyst bed under a second set of conditions; and
producing a hydrocarbon product stream comprising at least one product selected from the group consisting of high-octane gasoline, xylene, toluene, and benzene, wherein at least one of the first and second functionally distinctive beds comprises a first modified zeolitic catalyst comprising a first modified zeolite, a transition metal, and optionally a binder, and optionally a second modified zeolitic catalyst comprising a second modified zeolite, a second transition metal, and optionally a second binder, wherein one or both of the first modified zeolite and the second modified zeolite include a bulk silica-to-alumina ratio of about 80:1 or greater, a framework silica-to-alumina ratio of about 80:1, or both; and
wherein when the hydrocarbon product stream has a RON of about 95, the C5+ fraction yield is at least about 80 wt. %.

11. The method of claim 10, wherein the intermediate hydrocarbon stream comprises a naphthene content of not more than about 5 wt. %.

12. The method of claim 10, wherein the first functionally distinctive catalyst bed comprises a dehydrogenation catalyst and the second functionally distinctive catalyst bed comprises the first modified zeolitic catalyst comprising the first modified zeolite having a framework silica-to-alumina ratio of at least about 2000:1.

13. The method of claim 10, further comprising a third functionally distinctive catalyst bed comprising the second modified zeolitic catalyst downstream of the second functionally distinctive catalyst bed, wherein the second modified zeolite has a bulk silica-to-alumina ratio less than the bulk silica-to-alumina ratio of the first modified zeolitic catalyst.

14. The method of claim 10, wherein one or both of the first modified zeolite and the second modified zeolite comprises about 0.05 wt. % to about 5 wt. % extra-framework alumina, wherein one or both of the first modified zeolitic catalyst and the second modified zeolitic catalyst comprises about 0.05 wt. % to about 10 wt. % platinum, or a combination thereof.

15. The method of claim 10, wherein the second modified zeolitic catalyst includes a greater collidine uptake than the first modified zeolitic catalyst.

16. The method of claim 10, wherein one or both of the first modified zeolitic catalyst and the second modified zeolitic catalyst includes an alpha value of less than about 3.

* * * * *